United States Patent
Kane et al.

(10) Patent No.: US 9,715,789 B1
(45) Date of Patent: Jul. 25, 2017

(54) METHOD AND SYSTEM OF INCORPORATING TEAM CHALLENGES INTO A SOCIAL GAME

(75) Inventors: Michael Kane, San Francisco, CA (US); Harsimran Singh, Perth (AU)

(73) Assignee: Zynga Inc., San Francisco, CA (US)

(*) Notice: Subject to any disclaimer, the term of this patent is extended or adjusted under 35 U.S.C. 154(b) by 18 days.

(21) Appl. No.: 13/077,706

(22) Filed: Mar. 31, 2011

Related U.S. Application Data

(60) Provisional application No. 61/425,221, filed on Dec. 20, 2010.

(51) Int. Cl.
G07F 17/32 (2006.01)
G06Q 50/00 (2012.01)
A63F 13/795 (2014.01)
G06Q 30/02 (2012.01)
A63F 13/847 (2014.01)

(52) U.S. Cl.
CPC ........ *G07F 17/3274* (2013.01); *A63F 13/795* (2014.09); *A63F 13/847* (2014.09); *A63F 2300/558* (2013.01); *G06Q 30/0214* (2013.01); *G06Q 50/01* (2013.01)

(58) Field of Classification Search
CPC .............. A63F 2300/472; A63F 13/847; A63F 13/795; A63F 2300/558; G06Q 30/0214; G06Q 50/01; G07F 17/3274
USPC .......................................................... 463/29
See application file for complete search history.

(56) References Cited

U.S. PATENT DOCUMENTS

| | | | |
|---|---|---|---|
| 8,700,540 B1 * | 4/2014 | Zambrano | G06Q 50/01 705/319 |
| 9,076,303 B1 * | 7/2015 | Park | G07F 17/3274 |
| 2005/0107164 A1 | 5/2005 | Muir et al. | |
| 2006/0135264 A1 * | 6/2006 | Shaw et al. | 463/42 |
| 2006/0252501 A1 | 11/2006 | Little et al. | |
| 2009/0061999 A1 | 3/2009 | Popovich et al. | |
| 2009/0081923 A1 * | 3/2009 | Dooley et al. | 446/456 |
| 2009/0239666 A1 * | 9/2009 | Hall et al. | 463/42 |
| 2010/0240450 A1 * | 9/2010 | Vargas | A63F 13/12 463/29 |
| 2010/0279764 A1 | 11/2010 | Allen et al. | |
| 2010/0331084 A1 * | 12/2010 | Fuzell-Casey et al. | 463/31 |
| 2011/0029370 A1 * | 2/2011 | Roeding et al. | 705/14.38 |

(Continued)

OTHER PUBLICATIONS

"U.S. Appl. No. 13/244,788, Response filed Oct. 23, 2012 to Final Office Action mailed Jul. 23, 2012", 11 pgs.

(Continued)

*Primary Examiner* — Werner Garner
(74) *Attorney, Agent, or Firm* — Schwegman, Lundberg & Woessner, P.A.

(57) ABSTRACT

In a method and system of incorporating team challenges into a social game, a request to start a team challenge is received. The team challenge includes an in-game task that a plurality of players is to complete, with the plurality of players including an initiator and a helper. A selection of the helper from a set of buddies is received, with the set of buddies being based on a social network of the initiator. A completion of the in-game task by each of the plurality of players is detected. A reward is provided to each of the plurality of players based on the completion. In this way, new players are attracted to the social game, and current players increase their levels of participation in the social game.

7 Claims, 15 Drawing Sheets

(56) References Cited

U.S. PATENT DOCUMENTS

| | | |
|---|---|---|
| 2011/0201423 A1 | 8/2011 | Borst et al. |
| 2011/0307807 A1 | 12/2011 | Norby |
| 2011/0314482 A1 | 12/2011 | Cupala et al. |
| 2012/0094763 A1* | 4/2012 | Khan .................... 463/42 |
| 2012/0157211 A1 | 6/2012 | Kane et al. |
| 2012/0157212 A1 | 6/2012 | Kane et al. |

OTHER PUBLICATIONS

"U.S. Appl. No. 13/244,788 Response filed", 11 pgs.

"U.S. Appl. No. 13/244,788, Advisory Action mailed Nov. 8, 2012", 3 pgs.

"U.S. Appl. No. 13/244,788, Final Office Action mailed Jul. 23, 2012", 16 pgs.

"U.S. Appl. No. 13/244,788, Non Final Office Action mailed Feb. 17, 2012", 15 pgs.

"U.S. Appl. No. 13/244,796, Examiner Interview Summary mailed Feb. 17, 2012", 4 pgs.

"U.S. Appl. No. 13/244,796, Final Office Action mailed Jun. 28, 2012", 18 pgs.

"U.S. Appl. No. 13/244,796, Non Final Office Action mailed Jan. 20, 2012", 18 pgs.

"U.S. Appl. No. 13/244,796, Response filed Apr. 20, 2012 to Non Final Office Action mailed Jan. 20, 2012", 12 pgs.

"U.S. Appl. No. 13/244,796, Response filed Sep. 28, 2012 to Final Office Action mailed Jun. 28, 2012", 11 pgs.

"Apps on Facebook.com", Facebook, downloaded on Dec. 22, 2011, [Online]. Retrieved from the Internet: <http://web.archive.org/web/20101205130416/http://developers.facebook.com/docs/guide/canvas/>, (Dec. 5, 2010).

"U.S. Appl. No. 13/244,788, Examiner Interview Summary mailed Aug. 19, 2014", 4 pgs.

"U.S. Appl. No. 13/244,788, Non Final Office Action mailed Jul. 17, 2014", 25 pgs.

"U.S. Appl. No. 13/244,788, Response filed Oct. 17, 2014 to Non-Final Office Action dated Jul. 17, 2014", 14 pgs.

"U.S. Appl. No. 13/244,788, Response filed Dec. 21, 2012 to Advisory Action mailed Nov. 8, 2012", 10 pgs.

"U.S. Appl. No. 13/244,796, Response filed Oct. 9, 2014 to Non Final Office Action mailed Jul. 9, 2014", 13 pgs.

"U.S. Appl. No. 13/244,796, Response filed Oct. 9, 2014 to Non-Final Office Action dated Jul. 9, 2014", 13 pgs.

"U.S. Appl. No. 13/244,788, Final Office Action mailed Feb. 26, 2015", 27 pgs.

"U.S. Appl. No. 13/244,788, Response filed Jul. 27, 2015 to Final Office Action mailed Feb. 26, 2015", 26 pgs.

"U.S. Appl. No. 13/244,796, Advisory Action mailed Feb. 12, 2015", 2 pgs.

"U.S. Appl. No. 13/244,796, Examiner Interview Summary mailed Jun. 29, 2015", 4 pgs.

"U.S. Appl. No. 13/244,796, Examiner Interview Summary mailed Aug. 19, 2014", 7 pgs.

"U.S. Appl. No. 13/244,796, Final Office Action mailed Dec. 5, 2014", 29 pgs.

"U.S. Appl. No. 13/244,796, Non Final Office Action mailed Jul. 9, 2014", 25 pgs.

"U.S. Appl. No. 13/244,796, Response filed Feb. 3, 2015 to Final Office Action mailed Dec. 5, 2014", 22 pgs.

"U.S. Appl. No. 13/244,796, Response filed May 5, 2015 to Advisory Action mailed Feb. 12, 2015", 23 pgs.

"U.S. Appl. No. 13/244,788, Examiner Interview Summary mailed Apr. 6, 2016", 4 pgs.

"U.S. Appl. No. 13/244,788, Final Office Action mailed Jun. 8, 2016", 39 pgs.

"U.S. Appl. No. 13/244,788, Non Final Office Action mailed Feb. 10, 2016", 26 pgs.

"U.S. Appl. No. 13/244,788, Response filed Apr. 6, 2016 to Non Final Office Action mailed Feb. 10, 2016", 34 pgs.

"U.S. Appl. No. 13/244,796, Examiner Interview Summary mailed Apr. 6, 2016", 4 pgs.

"U.S. Appl. No. 13/244,796, Final Office Action mailed Jun. 8, 2016", 45 pgs.

"U.S. Appl. No. 13/244,796, Non Final Office Action mailed Feb. 5, 2016", 32 pgs.

"U.S. Appl. No. 13/244,796, Response filed Apr. 6, 2016 to Non Final Office Action mailed Feb. 5, 2016", 36 pgs.

\* cited by examiner

600

| Name: | Easy Money | 3-to-get ready | Risky Business | Hat Tricks | Knockouts | Gun Slingers |
|---|---|---|---|---|---|---|
| Ordering | 1 | 2 | 3 | 4 | 5 | 6 |
| Objective | Win a hand | Win 3 hands | Go all in to win a hand | Win hands in a row | Take a player's last on-table chips | Win a shootout round (any) |
| Number of times requirement must be met | 1 (i.e., Win a hand once) | 3 (i.e., Win 3 hands) | 1 | 3 (i.e., Win 3 hands in a row) | 1 | 1 |
| Buddies required | 2 | 3 | 5 | 4 | 4 | 5 |
| Time length | 48 hours | 72 hours | 72 hours | 24 hours | 5 days | 7 days |
| User Award | $5,000 +40XP | $7,500 +60XP | $12,500 +100XP | $30,000 +240XP | $40,000 +320XP | $100,000 +800XP |
| Buddy Award | $5,000 +40XP | $7,500 +60XP | $12,500 +100XP | $30,000 +240XP | $40,000 +320XP | $100,000 +800XP |
| Starting Cost | $0 | $0 | $0 | $0 | $0 | $0 |
| Start Window | 12 hours | 18 hours | 18 hours | 12 hours | 24 hours | 24 hours |
| Max Starts In Window | 5 | 5 | 5 | 2 | 2 | 2 |
| Help Window | 12 hours | 18 hours | 18 hours | 12 hours | 24 hours | 24 hours |
| Max Helps In Window | 5 | 5 | 5 | 2 | 2 | 2 |

| Type: | Most Wins In-a-Row | Most Knockouts |
|---|---|---|
| Requirement | Maximum number of wins in a row | Total number of knockouts (Take another players last on-table chips) |
| Min Buddies required | 3 | 3 |
| Time length of Challenge | 24 hours | 48 hours (5 days) |
| Player Clock (starts once accepted) | 1 hour | 3 hours |
| Unlock level (option) | 0 | 10 |
| Player Buy-in Cost | $500 | $1000 |

FIG. 7

METHOD AND SYSTEM OF INCORPORATING TEAM CHALLENGES INTO A SOCIAL GAME

CROSS REFERENCE TO RELATED APPLICATIONS

This application claims the benefit of U.S. Provisional Application No. 61/425,221, filed Dec. 20, 2010, entitled "METHOD AND SYSTEM OF INCORPORATING TEAM CHALLENGES INTO A SOCIAL GAME," which is incorporated herein by reference in its entirety.

TECHNICAL FIELD

The present application relates generally to the technical field of implementing social games, and, in one specific example, to incorporating team challenges into computer-implemented online social games.

BACKGROUND

In many games, there is a virtual world or some other imagined playing space where a player/user of the game controls one or more player characters (herein "character," "player character," or "PC"). Player characters can be considered in-game representations of the controlling player. As used herein, the terms "player," "user," "entity," and "friend" may refer to the in-game player character controlled by that player, user, entity, or friend, unless context suggests otherwise. The game display can display a representation of the player character. A game engine accepts inputs from the player, determines player character actions, decides outcomes of events and presents the player with a game display illuminating what happened. In some games, there are multiple players, wherein each player controls one or more player characters.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, and so forth. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

An electronic social networking system typically operates with one or more social networking servers providing interaction between users such that a user can specify other users of the social networking system as "friends." A collection of users and the "friend" connections between users can form a social graph that can be traversed to find second, third and more remote connections between users, much like a graph of nodes connected by edges can be traversed.

Many online computer games are operated on an online social network. Such a network allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, Internet Explorer).

In many computer games, there are various types of in-game actions that a player character can make within the game. For example, a player character in an online role-playing game may be able to interact with other player characters, build a virtual house, attack enemies, go on a quest, go to a virtual store to buy/sell virtual items, and the like. A player character in an online poker game may be able to play at specific tables, place bets of virtual currency for certain amounts, play or fold certain hands, play in a online poker tournament, and so forth.

BRIEF DESCRIPTION OF THE DRAWINGS

Some embodiments are illustrated by way of example and not limitation in the figures of the accompanying drawings in which:

FIG. 6 is a table illustrating an example set of team challenge definitions;

FIG. 7 is a table illustrating an additional example set of team challenge definitions;

DETAILED DESCRIPTION

In the following description, for purposes of explanation, numerous specific details are set forth in order to provide an understanding of various embodiments of the present subject matter. It will be evident, however, to those skilled in the art that various embodiments may be practiced without these specific details.

In a method of incorporating team challenges into a social game, a request to start a team challenge is received, with the team challenge including an in-game task that a plurality of players is to complete; the plurality of players includes an initiator and a helper. A selection of the helper from a set of buddies is received, with the set of buddies being based on a social network of the initiator. A completion of the in-game task by each of the plurality of players is detected. A reward is provided to each of the plurality of players based on the completion. In this way, new players are attracted to the social game and current players increase their levels of participation in the social game.

Figure 1:
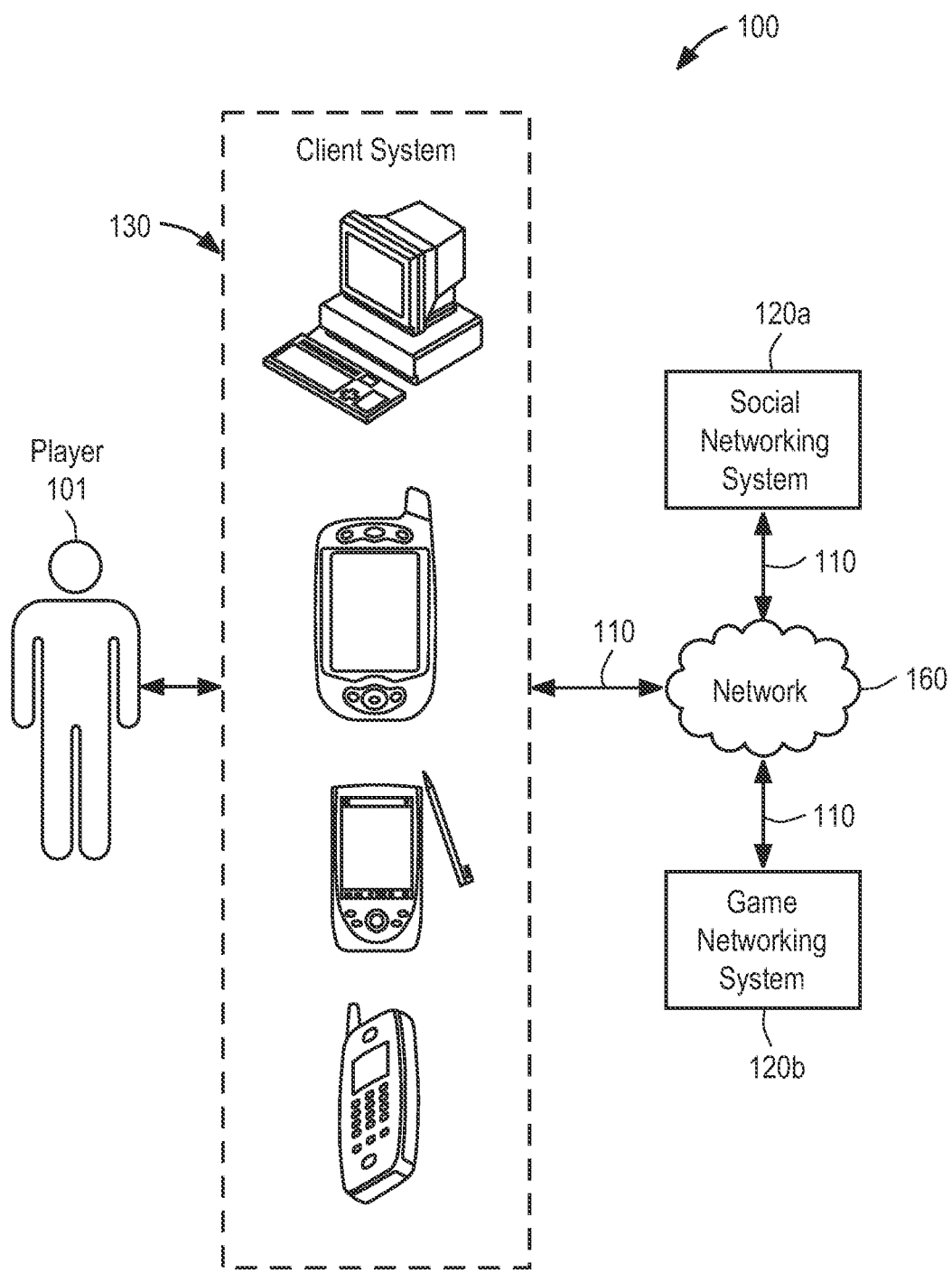
FIG. 1 is a block diagram illustrating an example of a system for implementing various disclosed embodiments.

FIG. 1 is a block diagram illustrating an example of a system 100 for implementing various disclosed embodiments. In particular embodiments, system 100 comprises player 101, social networking system 120a, game networking system 120b, client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 120a is a network-addressable computing system that can host one or more social graphs. Social networking system 120a can generate, store, receive, and transmit social networking data. Social networking system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accessed by the other components of system 100 either directly or via network 160. Player 101 may use client system 130 to access, send data to, and receive data from social networking system 120a and game networking system 120b. Client system 130 can access social networking system 120a or game networking system 120b directly, via network 160, or via a third-party system. As an example and not by way of limitation, client system 130 may access game networking system 120b via social networking system 120a. Client system 130 can be any suitable computing device, such as a personal computer, laptop, cellular phone, smart phone, computing tablet, and the like.

Although FIG. 1 illustrates a particular number of players 101, social networking systems 120a, game networking systems 120b, client systems 130, and networks 160, this disclosure contemplates any suitable number of players 101, social networking systems 120a, game networking systems 120b, client systems 130, and networks 160. As an example and not by way of limitation, system 100 may include one or more game networking systems 120b and no social networking systems 120a. As another example and not by way of limitation, system 100 may include a system that comprises both social networking system 120a and game networking system 120b. Moreover, although FIG. 1 illustrates a particular arrangement of player 101, social networking system 120a, game networking system 120b, client system 130, and network 160, this disclosure contemplates any suitable arrangement of player 101, social networking system 120a, game networking system 120b, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include one or more of an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 120a, game networking system 120b, client system 130, and network 160, this disclosure contemplates any suitable connections between player 101, social networking system 120a, game networking system 120b, client system 130, and network 160. As an example and not by way of limitation, in particular embodiments, client system 130 may have a direct connection to social networking system 120a or game networking system 120b, thereby bypassing network 160.

Online Games and Game Systems

Game Networking Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including NPCs and in-game objects. The game engine also manages game state, including player character state for currently active (online) and inactive (offline) players.

An online game can be hosted by game networking system 120b, which can be accessed using any suitable connection with a suitable client system 130. A player may have a game account on game networking system 120b, wherein the game account can contain a variety of information associated with the player (e.g., the player's personal information, financial information, purchase history, player character state, game state, etc). In some embodiments, a player may play multiple games on game networking system 120b, which may maintain a single game account for the player with respect to all the games, or multiple individual game accounts for each game with respect to the player. In some embodiments, game networking system 120b can assign a unique identifier to each player 101 of an online game hosted on game networking system 120b. Game networking system 120b can determine that a player 101 is accessing the online game by reading the user's cookies, which may be appended to Hypertext Transfer Protocol (HTTP) requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmit user inputs or other events to the game engine, and receive instructions from the game engine. The game engine can be executed on any suitable system (such as, for example, client system 130, social networking system 120*a*, or game networking system 120*b*). As an example and not by way of limitation, client system 130 can download client components of an online game, which are executed locally, while a remote game server, such as game networking system 120*b*, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120*b*.

Game Systems, Social Networks, and Social Graphs

In an online multiplayer game, players may control player characters (PCs) and a game engine controls non-player characters (NPCs) and game features. The game engine also manages player character state and game state and tracks the state for currently active (i.e., online) players and currently inactive offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a watt or castle), and so forth. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is a copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure contemplates any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within Nmax degrees of the player, where Nmax is the maximum degree of separation allowed by the system managing the social graph (such as, for example, social networking system 120a or game networking system 120b). In one embodiment, Nmax equals 1, such that the player's social network includes only first-degree friends. In another embodiment, Nmax is unlimited and the player's social network is coextensive with the social graph.

In particular embodiments, the social graph is managed by game networking system 120b, which is managed by the game operator. In other embodiments, the social graph is part of a social networking system 120a managed by a third-party (e.g., Facebook, Friendster, Myspace). In yet other embodiments, player 101 has a social network on both game networking system 120b and social networking system 120a, wherein player 101 can have a social network on the game networking system 120b that is a subset, superset, or independent of the player's social network on social networking system 120a. In such combined systems, game network system 120b can maintain social graph information with edge type attributes that indicate whether a given friend is an "in-game friend," an "out-of-game friend," or both. The various embodiments disclosed herein are operable when the social graph is managed by social networking system 120a, game networking system 120b, or both.

Figure 2:
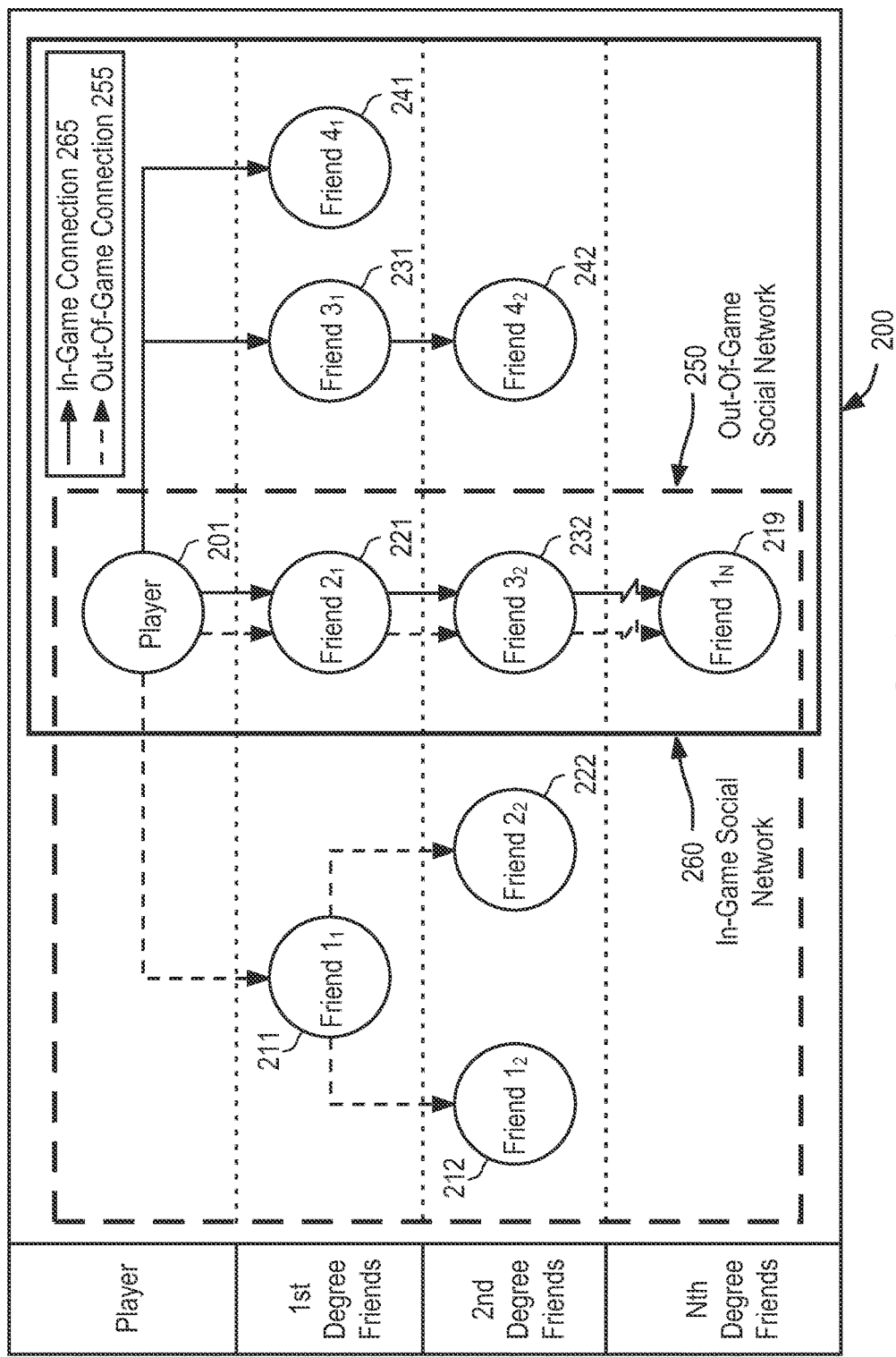
FIG. 2 is a block diagram illustrating an example of a social network within a social graph.

FIG. 2 is a block diagram illustrating an example of a social network 200 within a social graph. As shown, Player 201 can be associated, connected or linked to various other users, or "friends," within the out-of-game social network 250. These associations, connections or links can track relationships between users within the out-of-game social network 250 and are commonly referred to as online "friends" or "friendships" between users. Each friend or friendship in a particular user's social network within a social graph is commonly referred to as a "node." For purposes of illustration and not by way of limitation, the details of out-of-game social network 250 will be described in relation to Player 201. As used herein, the terms "player" and "user" can be used interchangeably and can refer to any user or character in an online multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In out-of-game social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to whom he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 120a.

In various embodiments, Player 201 can have Nth-degree friends connected to him through a chain of intermediary degree friends as indicated in FIG. 2. For example, Nth-degree Friend $1_N$ 219 is connected to Player 201 via second-degree Friend $3_2$ 232 and one or more other higher-degree friends. Various embodiments may utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260, and friend $4_2$ 242 is a second-degree friend with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out-of-game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access an in-game social network 260, out-of-game social network 250, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Game Systems

A game event may be an outcome of an engagement, a provision of access, rights and/or benefits, or the obtaining of some assets (e.g., health, money, strength, inventory, land, etc.). A game engine determines the outcome of a game event according to a variety of factors, such as the game rules, a player character's in-game actions, player character state, game state, interactions of other player characters, and random calculations. Engagements can include simple tasks (e.g., plant a crop, clean a stove), complex tasks (e.g., build a farm or business, run a café), or other events.

An online game can be hosted by a game networking system 620b, which can be accessed over any suitable network with an appropriate client system 630. A player may have a game system account on game networking system 620b, wherein the game system account can contain a variety of information about the player (e.g., the player's personal information, player character state, game state, etc.). In various embodiments, an online game can be embedded into a third-party website. The game can be hosted by the networking system of the third-party website, or it can be hosted on game networking system 320b and merely accessed via the third-party website. The embedded online game can be hosted solely on a server of game networking system 620b or using a third-party vendor server. In addition, any combination of the functions of the present disclosure can be hosted on or provided from any number of distributed network resources. For example, one or more executable code objects that implement all or a portion of the game can be downloaded to a client system for execution.

Virtual Currency

In various embodiments, players within the game can acquire virtual currency. In such games, the virtual currency might be represented by virtual coins, virtual cash, or by a number or value stored by the server for that player's benefit. Such virtual currency represents units of value for use in the online game system, and is analogous to legal currency. Virtual currency can be purchased in one or more actual cash or credit transactions by a player, where the legal currency is transferred using a credit/debit/charge card transaction conveyed over a financial network. In some embodiments, a player may earn virtual currency by taking action in the game. For example, a player may be rewarded with one or more units of virtual currency after completing a task, quest, challenge, or mission within the game. For example, a farming game might reward 10 gold coins each time a virtual crop is harvested.

In some embodiments, virtual currency can be used to purchase one or more in-game assets or other benefits. For example, a player may be able to exchange virtual currency for a desired level, access, right, or item in an online game. In one embodiment, legal currency can be used to directly purchase an in-game asset or other benefit. The player can select the desired in-game asset or other benefit. Once appropriate selections are made, the player can place the order to purchase the in-game asset or other benefit. This order is received by the game networking system 620b, which can then process the order. If the order is processed successfully, an appropriate financial account associated with the player can be debited by the amount of virtual currency or legal currency needed to buy the selected in-game asset or other benefit.

In some embodiments, multiple types of virtual currency may be available for purchase from the game system operator. For example, an online game may have virtual gold coins and virtual cash. The different types of virtual currency may have different exchange rates with respect to legal currency and each other. For example, a player may be able to exchange $1 in legal currency for either 100 virtual gold coins or $2 in virtual cash, but virtual gold coins may not be exchanged for virtual cash. Similarly, where in-game assets and other benefits can be purchased with virtual currency, they may have different exchange rates with respect to the different types of virtual currency. For example, a player may be able to buy a virtual business object for $10 in virtual cash, but may not purchase the virtual business object for virtual gold coins alone. In some embodiments, certain types of virtual currency can be acquired by engaging in various in-game actions while other types of virtual currency can only be acquired by exchanging legal currency. For example, a player may be able to acquire virtual gold coins by selling virtual goods in a business, but can only acquire virtual cash by exchanging legal currency. In some implementations, virtual cash may also be awarded for leveling up in the game.

Team Challenges

Figure 3:
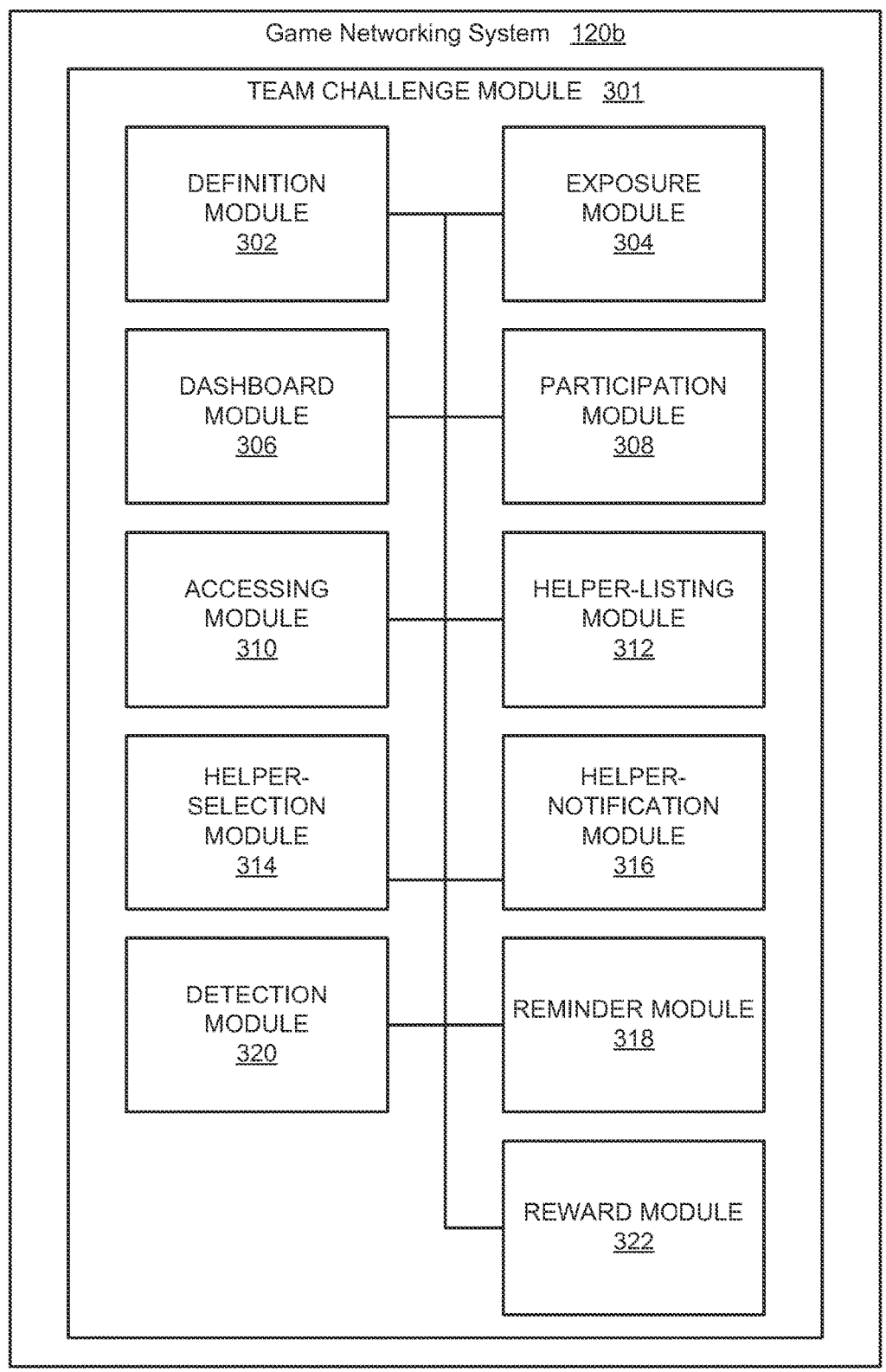
FIG. 3 is a block diagram illustrating example modules of a game networking system for incorporating team challenges into a social game.

FIG. 3 is a block diagram illustrating example modules of the game networking system 120b related to incorporating team challenges into a social game. As defined herein, a "challenge" is a task or problem. For example, a challenge relating to a poker game may be to win a hand or win a particular number of hands in a row. As defined herein, a "team challenge" is a challenge for two or more members of a team. For example, a team challenge relating to a poker game may be that two or more players each win a particular number of hands in a row. A team may include an initiator of the team challenge and one or more helpers.

A team challenge may be a collaborative team challenge or a competitive team challenge. In a collaborative team challenge, each of the two or more members of the team work collaboratively to complete the challenge. In some embodiments, one or more of the members of the team may be assigned a different task than other members of the team. In a competitive team challenge, one or more members of the team compete against other members of the team in completing the challenge. For example, a competitive team challenge related to a poker game may be to knock out (e.g., take the last on-table chips of) as many players as possible in 48 hours. The winner of such a competitive challenge may be the member of the team who knocks out the most players.

The game networking system 120b includes a team challenge module 301 that is configured to incorporate team challenges into a social game. The team challenge module 301, in turn, includes various modules 302-322. The definition module 302 is configured to receive, generate, and maintain definitions of team challenges. (Definitions are described in more detail below.) The exposure module 304 is configured to expose the team challenges to the players of the social game. For example, the exposure module 304 may publish information pertaining to a team challenge in a "friend feed" of a player. The dashboard module 306 is configured to provide a dashboard to a player for viewing the status of or participating in team challenges.

The participation module 308 is configured to receive or detect an indication of interest by a player in participating in a team challenge either as an initiator or as a helper. The accessing module 310 is configured to access one or more social networks of a player (e.g., an out-of-game social network or an in-game social network of the player). For example, the accessing module 310 may obtain a list of all of a player's friends from the social networks of the player. The accessing module 310 may also obtain private information about the player from the social network.

The helper-listing module 312 is configured to display information about one or more buddies of the player that the player may invite to participate in the challenge. The helper-listing module 312 may list all friends of the player derived from the accessing of the social network by the accessing module 310. The helper-listing module 312 may also list a subset of the friends (e.g., recommended friends) based on information obtained from the social network or based on information known by the game networking system 120b independently of the information obtained from the social network. For example, the helper-listing module 312 may list the most active players of the social game as recommended friends.

The helper-selection module 314 is configured to receive a selection of one or more of a player's buddies to invite as helpers toward the completion of a team challenge. The helper-notification module 316 is configured to notify the helpers of their selection by the player via an in-game or out-of-game communication mechanisms. In-game communication mechanisms may include shouts (e.g., messages displayed temporarily to a player while the player is accessing the social game), pokergrams (described below), or friend feeds (described below). Out-of-game communication mechanisms may include email messages or postings on a social network site on behalf of the player. Additionally, out-of-game communication mechanisms may include interfacing with an out-of-game social networking system to post items to a news feed of the player's buddies or post a request that the player's buddies perform an action (e.g., help the player complete a team challenge). The detection module 320 is configured to detect whether the participants in a team challenge (e.g., the initiator and his one or more helpers) have completed the team challenge.

The reminder module 318 is configured to remind players of their participation in the team challenge or the requirements to complete it. For example, the reminder module 318 may notify the participants of the team challenge of a time remaining to complete the team challenge. The reward module 322 is configured to provide a reward to the participants of a team challenge based on their completion of the team challenge. The reward may include in-game or out-of-game rewards, or a combination of in-game and out-of-game rewards. For example, the reward may include virtual cash or experience points, or both. Or the reward may include a gift certificate or actual cash.

Figure 4:
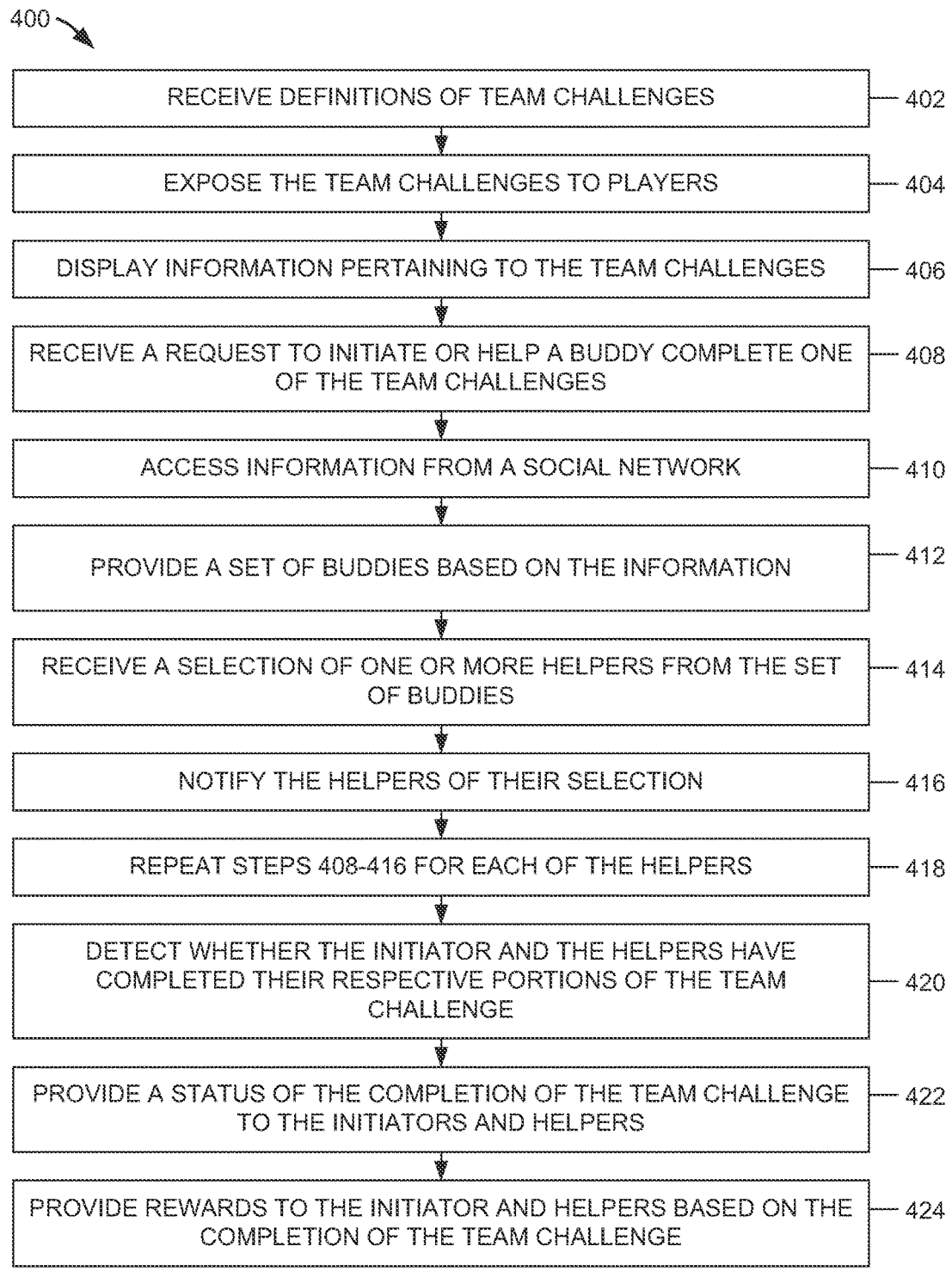
FIG. 4 is a flowchart illustrating an example method of incorporating team challenges into a social game.

FIG. 4 is a flowchart illustrating an example method 400 of incorporating team challenges into a social game. At operation 402, the definition module 302 receives definitions of one or more team challenges. A definition may include a name of the challenge (e.g., "EasyMoney," "3-to-Get-Ready," "Risky Business," "Hat Tricks," "Knockouts," or "Gunslingers"). A definition may include an objective (or requirement) of the challenge. For example, a definition may specify that the objective is for each member of the team to win a hand, win three hands in a row, go all in (e.g., bet all of one's chips) and win a hand, take a player's last on-table chips, win a particular type of poker game (e.g., a particular round of a shootout), or have a particular level of performance in a particular type of poker game (e.g., place in the top 5% of players in a weekly tournament). A definition may include a number of times that the objective must be met.

For example, a definition may specify that the objective must be met three times. In this case, if the objective is for each member of the team to win three hands in a row, the challenge would be completed when each member of the team wins three hands in a row three times.

A definition may include a number (e.g., an exact, minimum, or maximum number) of members of the team that must complete the task. For example, the definition may specify that five players must complete the challenge. In this case, if the objective is for each member of the team win a hand, the challenge would be completed when five members of the team win a hand.

A definition may include a time constraint. For example, the definition may specify that the challenge must be completed in a particular number of minutes, hours, days, weeks, months, or years.

A definition may include one or more rewards that members of the team may receive upon completion of the task. All members of the team may be offered the same reward. Alternatively, one or more members of the team may be offered a different reward than one or more other members of the team. For example, the initiator of the challenge may be offered a reward that has a higher value than rewards offered to other members of the team. The reward may be virtual currency, experience points, gold coins, or any combination of such rewards.

A definition may include a starting cost. For example, the definition may specify that each member of the team must make a particular virtual currency payment (e.g., $500 in poker chips) in order to participate in the challenge.

A definition may include a start window. In other words, the definition may specify a window of time (e.g., 24 hours) in which an initiator of a challenge may start a challenge a maximum number of times.

A definition may include the maximum number of times that the initiator may start the challenge in the start window. For example, the definition may specify that the initiator may initiate a particular challenge (e.g., win a hand) a maximum of live times during the start window.

A definition may include a help window. In other words, the definition may specify a window of time (e.g., 12 hours) in which a helper may help toward the completion of a challenge a maximum number of times.

A definition may include the maximum number of times that the helper may help toward the completion of the challenge in the help window. For example, the definition may specify that a helper may help complete a particular challenge (e.g., win three hands in a row) a maximum of five times during the help window.

A definition may include an ordering for the challenge. For example, the definition may specify an index number (e.g., "1") for a first challenge that is lower than an index number (e.g., "3") for a second challenge based on a determination that the first challenge is an easier challenge than the second challenge. A status module (described below) may use the ordering associated with each challenge to determine the order in which to present the challenges to the user.

A definition of a collaborative team challenge may include different elements than a definition of a competitive team challenge. For example, a definition of either type of team challenge may include common elements of an objective, a minimum number of buddies, and a time constraint. However, a competitive team challenge may include, in addition to the common elements, a player clock that starts running when the team challenge is accepted by the player and stops running after a predetermined amount of time elapses (e.g., 1 hour), a global challenge clock that determines when players' scores will be compared, an "unlock level" value that specifies a level of experience that a player must have to initiate or participate in the team challenge, and a buy-in value that specifies an amount of in-game currency (e.g., poker chips) that a player must provide to participate in the challenge. Examples of sets of team challenge definitions are illustrated in FIG. 6 and FIG. 7.

Additionally, the rewards for a competitive team challenge may be based on the total of all of the player buy-ins. For example, the first place winner may receive 50% of the buy-ins, the second-place winner may receive 30% of the buy-ins, and the third-place winner may receive 20% of the buy-ins.

Each of the one or more definitions of the team challenges may be provided by an administrator of the game-networking system 120*b*. Alternatively, the definition may be generated automatically based on an enumeration of possible tasks.

At operation 404, the exposure module 304 exposes the team challenges to players of the social game. For example, the exposure module 304 may display a "Challenge" icon (e.g., Challenge icon 810 of FIG. 8) within the user interface of the social game. The "Challenge" icon, when clicked by a player, may cause the dashboard module 306 to display a status of the player with respect to each of the defined team challenges. Or the exposure module 304 may cause a button or link pertaining to the challenges to be displayed in a news feed (e.g., a new feed associated with the social game or a news feed associated with the out-of-game social network 102*a*).

For example, if one of a player's buddies is making progress toward the completion of a team challenge, the exposure module 304 may cause a news item pertaining to the team challenge to be displayed in an in-game news feed (e.g., "Friend Feed") of the player. The news item may include a button or link related to team challenges. Upon a clicking of the button or link, the dashboard module 306 may present a user interface from which the player can indicate his willingness to help a buddy complete a challenge or from which the player can initiate a new challenge.

At operation 406, the dashboard module 306 displays information pertaining to the team challenges (e.g., in response to a clicking of the "Challenge" icon by a player from within the user interface of the game, as described above). The dashboard may be a user interface from which a player can initiate a challenge, agree to help buddies complete a challenge, or call for help in completing the player's own challenge or a challenge of one of the player's buddies.

The dashboard may display information from the definition of each team challenge, such as the objective of the team challenge, the time constraint associated with the challenge, and the number of helpers that must complete the challenge. The dashboard may also display a live timer showing a countdown of a time remaining for the completion of each challenge that the player has initiated or agreed to help complete. The dashboard may also show a progress toward the completion of each challenge (e.g., a percentage of completion) for which the player is an initiator or helper. The dashboard may also show which players have completed their portion of each team challenge. For example, in a status entry for each challenge, the dashboard may show a picture of each player who has completed a portion of the challenge.

The dashboard may separate (e.g., via tabs of a user interface) a display of information pertaining to team challenges initiated by the player from a display of information pertaining to team challenges initiated by the player's buddies. The dashboard may also organize the information about the team challenges such that information about new team challenges, in-progress team challenges, completed team challenges, and failed team challenges is grouped together.

For each team challenge that has not been initiated by the player, the dashboard may provide a mechanism (e.g., a "Start and Get Help" button) by which the player may initiate the challenge.

For each team challenge that has been initiated by one of the player's buddies, but for which the player has not yet agreed to help, the dashboard may provide a mechanism (e.g., a "Help Buddy" button) through which the player may indicate his willingness to help his buddy complete the task. When a player clicks on this user interface element, the dashboard module 306 may also provide (e.g., via the participation module 308) the player with an option to select additional players to help his buddy toward the completion of the task.

For each team challenge that has been initiated by the player or one of the player's buddies, but has not yet been completed by enough buddies, the dashboard module 306 may provide a mechanism (e.g., a "Call for Help" button) through which the player may request (e.g., via the participation module 308) additional buddies to help complete the task.

For each team challenge that is completed, the dashboard may display information about the reward. For example, if a team challenge is completed, but the player did not perform that task he was assigned, the player may be notified that he did not receive a reward. Or, if the team challenge is completed, and the player completed his portion of the team challenge, the player may be notified that he received the reward, such as a particular amount of virtual currency (e.g., poker chips) and a particular amount of experience points.

For each team challenge that is not completed, the dashboard may display information about why the task was not completed. For example, the dashboard may indicate that particular players completed their portions of the team challenge, but particular other players did not complete their portions.

At operation 408, the participation module 308 receives a request from a player to initiate or help a buddy complete one of the team challenges. For example, the request may be received as a result of the player clicking on a "Start and Get Help" button associated with the team challenge on the dashboard described above.

At operation 410, the accessing module 310 accesses information pertaining to one or more social networks of the player. The social networks may be in-game social networks or out-of-game social networks. The information may, be information that the player previously allowed the game networking system 120*b* to extract from the social networking system 120*a*. For example, when accessing the social game for the first time, the player may have granted permission for the game networking system 120*b* to access to the information. The information may be any information that the social networks maintain about the player, including personal information about the player and listings of the player's acknowledged friends.

At operation 412, the helper-listing module 312 provides (e.g., via a user interface) a set of the player's buddies who may be willing to help the player complete the team challenge. The set of the player's buddies may be based on information obtained from the social networks of the player. The set of the player's buddies may also be based on information maintained by the gaming network system 120a independently of the information obtained about the buddies from the social networks of the player. The helper-listing module 312 may determine recommended helpers based on the information about the buddies. The helper-listing module 312 may provide a listing of all of the player's friends on a first tab of a user interface and a listing of recommended ones of the player's friends on a second tab of the user interface.

At operation 414, the helper-selection module 314 receives a selection of helpers from the set of buddies. For example, the player may select the helpers from the displayed set of the player's buddies by selecting a checkbox user interface element associated with each of the selected buddies and displayed by the helper-listing module 312.

At operation 416, the helper-notification module 316 notifies the helpers of their selection to participate in the team challenge. For example, the helper-notification module 316 may notify the selected buddies via an email message or a posting on the player's behalf on an out-of-game social network. Thus, even selected buddies who have never accessed the social game network 120b may be notified of their selection by the player. The helper-notification module 316 may notify selected buddies who are also players of the game via one or more in-game mechanisms, such as shouts, pokergrams, friend feeds, message centers, or other mechanisms.

At operation 418, operations 408-416 are repeated for each of the selected buddies. At operation 420, the detection module 320 detects whether the initiator and the helpers have completed their respective portions of the team challenge.

At operation 422, the reminder module 322 provides a status of the completion of the project to the initiator and the helpers. For example, if a team challenge is about to end (e.g., the time limit of the team challenge is about to be exceeded), the reminder module 322 may remind the initiator and helpers about what needs to be done and how much time is left.

At operation 424, the reward module 324 provides rewards to the initiator and the helpers based on the completion of the team challenge. For example, upon a completion of a team challenge, the initiator and the helpers may each receive $5,000 in virtual cash and 40 experience points. In various embodiments, the reward module 324 provides a reward only when the player takes an action to claim the reward (e.g., when the user clicks on a "Claim Reward" button).

The reward module 322 may also update information regarding each player's level of mastery of team challenges. For example, the reward module 324 may associate a mastery level with each player. The reward module 324 may also provide a visual bar showing the percentage of achieving the next mastery level. For example, a player that completes 1-4 team challenges might have a "Beginner" mastery level, a player that completes 5-9 challenges may have an "Intermediate" mastery level, a player that completes 10-24 challenges may have an "Advanced" mastery level, and a player that completes 25 or more challenges may have a "Mastered" mastery level.

The reward module 324 may incorporate information regarding challenge mastery into a profile of the user. For example, underneath a picture of the player in the player profile, the reward module 324 may display the mastery level. Mastery levels may be tracked with regard to team challenges as a whole or for individual team challenges.

The reward module 324 may unlock more advanced team challenges for participation by the user based on the player's mastery level of easier team challenges or based on the player's experience level (e.g., as determined by experience points received by the player for performing various in-game tasks, including participating in team challenges).

The reward module 324 may increase the amount of the reward for a challenge that has not been completed and for which the time limit is about to be reached. In this case, the reward module 324 may notify players of the new reward amount (e.g., via the reminder module 322).

The reward module 324 may keep track of challenges that were not completed successfully and notify the initiators and helpers of the reward they lost by not completing the challenge and who was responsible for the failure.

Figure 5:
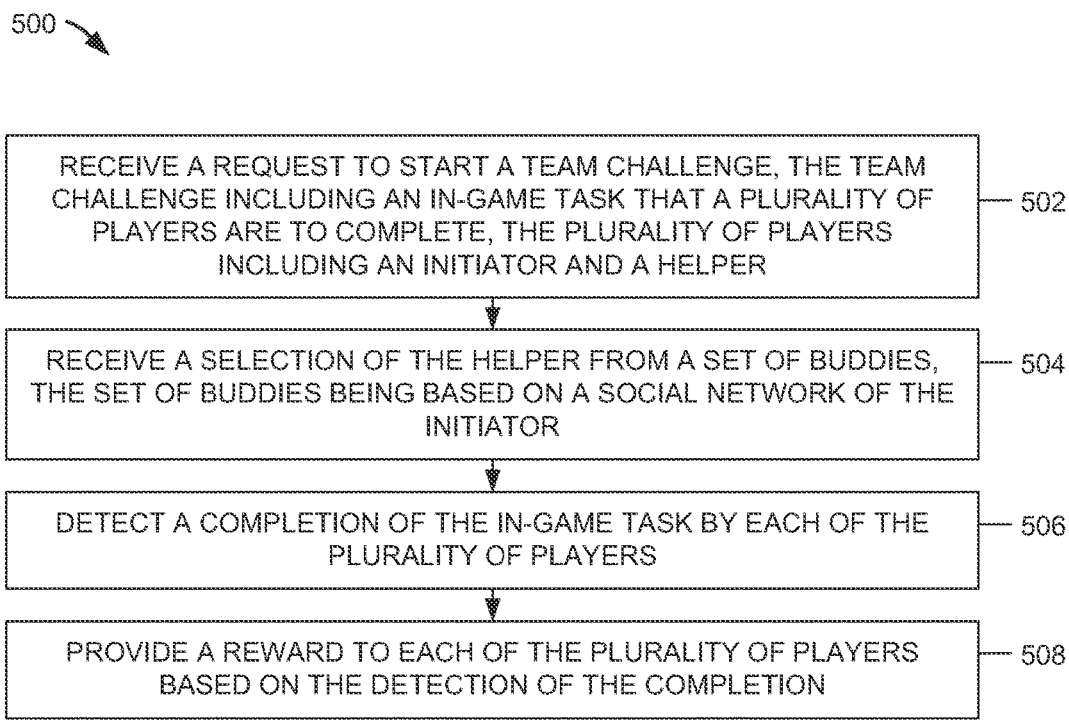
FIG. 5 is a flowchart illustrating an additional example method of incorporating team challenges into a social game.

FIG. 5 is a flowchart illustrating an example method 500 of incorporating team challenges into a social game. At operation 502, the participation module 308 receives a request to start a team challenge, with the team challenge including an in-game task that a plurality of players is to complete. The plurality of players may include an initiator and a helper. At operation 504, the helper-selection module 314 receives a selection of the helpers from a set of buddies, with the set of buddies being based on a social network of the initiator. At operation 506, the detection module 320 detects a completion of the in-game task by each of the plurality of players. At operation 508, the reward module 324 provides a reward to each of the plurality of players based on the detection of the completion.

FIG. 6 is a table illustrating an example set 600 of team challenge definitions. Each of the elements of each of the definitions of the set 600 is described above with respect to FIG. 4. FIG. 7 is a table illustrating an additional example set 700 of team challenge definitions. Each of the elements of each of the definitions of the set 700 is described above with respect to FIG. 4. In example embodiments, the set 600 may correspond to collaborative team challenges and the set 700 may correspond to competitive team challenges.

Game Interfaces

Figure 8:
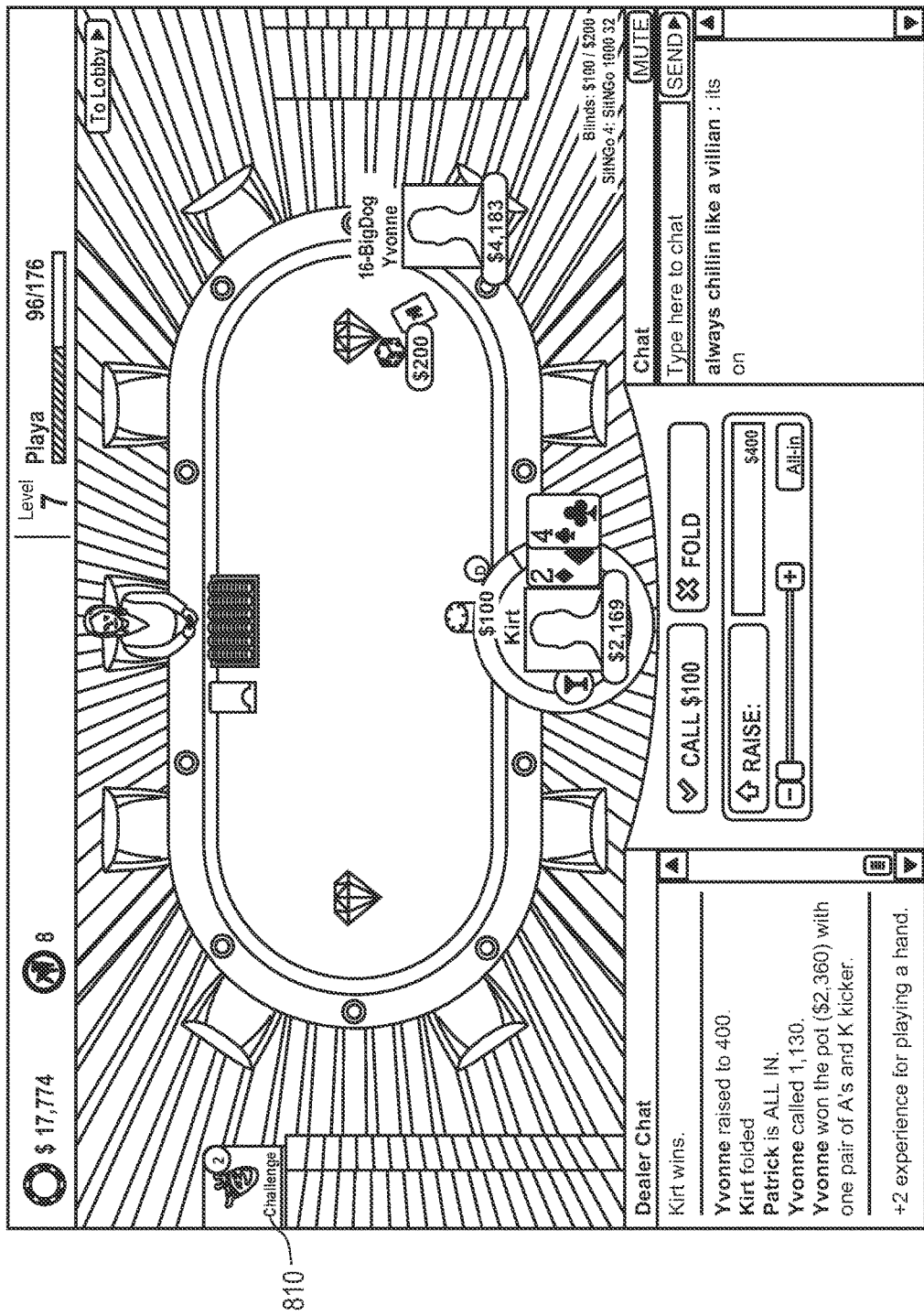
FIG. 8 is a block diagram illustrating an example of a webpage-based game interface for an online game accessed by a browser client.

FIG. 8 is a block diagram illustrating an example of a webpage-based game interface for an online game accessed by client systems 630. In various embodiments, a user 101 of a client system 630 can use a browser client (e.g., Firefox, Chrome, Internet Explorer, etc.) to access the online game over the Internet (or other suitable network). The game interface 870 illustrated in FIG. 8 may be automatically generated and presented to the user in response to the user visiting or accessing the game operator's website or a third-party's website from client system 130 with a browser client. Game networking system 120b can transmit data to client system 130, thereby allowing it to display game interface 870, which is typically some type of graphic user interface. For example, the webpage downloaded to client system 130 may include an embedded call that causes client system 130 to download an executable object, such as a Flash .SWF object, which executes on client system 130 and renders the game within the context of the webpage. Other interface types are possible, such as server-side rendering and the like. Game interface 870 is configured to receive signals from the user 101 via client system 130. For example, the user 101 can click on game interface 870 or enter commands from a keyboard or other suitable input device. The game engine can respond to these signals to allow game play. The display of game interface 870 can change based on the output of the game engine, the input of the player, and other signals from game networking system 120b and client system 130.

The game interface 870 can display various game components, such as the game environment, options available to the player (e.g., in-game actions, preferences, settings, etc.), game results, and so forth. Some components of the game interface may be static, while others may be dynamic (e.g., changing with game play). The user may be able to interact with some components (e.g., player character, NPCs, virtual objects, etc.) and not interact with other components (e.g., the background of the virtual world, such as the virtual street or sidewalk). The user can engage in specific in-game actions or activities by providing input to game interface 870.

In the example online game illustrated in FIG. 8, the user plays poker on a virtual poker table in an online social game. Game interface 870 shows the virtual poker table and various actions that the user can perform. The player can interact with various elements of the interface, such as the call, fold, and raise buttons of the action bar 820. The user can click on (or otherwise activate) various aspects of the game interface to provide instructions to the game engine. For example, by clicking on the Challenge icon 810, the user can participate in team challenges. In various embodiments, the Challenge icon 810 includes a counter (e.g., "2") indicating a number of updates to statuses of team challenges pertaining to a player (e.g., since the statuses were last viewed by the player).

The user can also click on various user interface elements in game interface 870 to activate various game options. For example, if the user clicks on one of the buttons in action bar 860 to call, fold, or raise, the game engine will alter the game interface 870 to show the result of the action. For example, the player could click on the All-in button and the Raise button, causing the game engine to alter the game interface 870 to show all of the player's chips moving toward the center of the table.

One skilled in the art would appreciate that FIG. 8 is presented merely as an example of an embodiment of one type of online game and that the present disclosure is intended to encompass a variety of game types, including gambling games, role-playing games, puzzle games, and the like.

Figure 9:
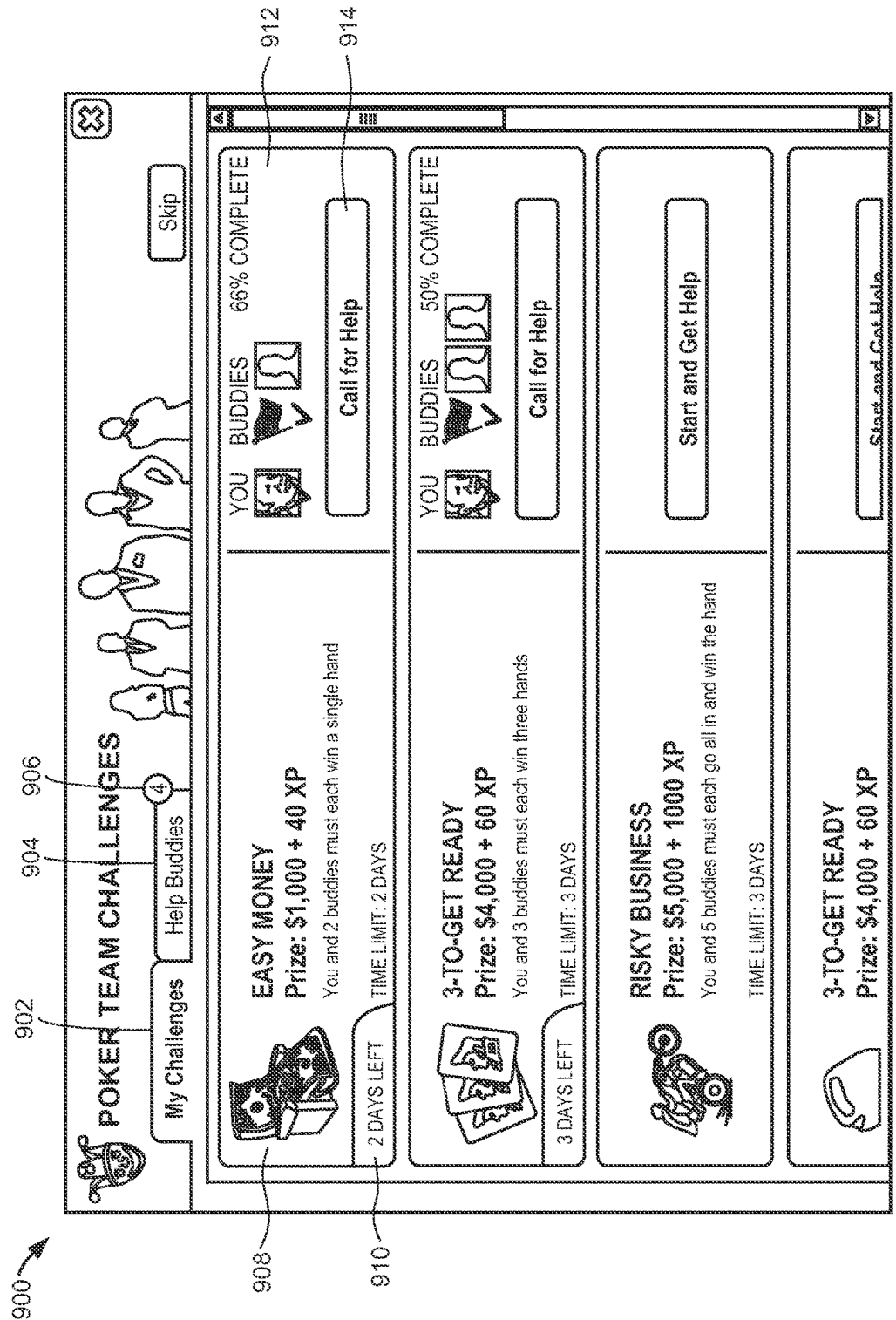
FIG. 9 is a block diagram illustrating an example dashboard for team challenges for a poker game.

FIG. 9 is a block diagram illustrating an example dashboard 900 for team challenges for a poker game. The dashboard may be displayed by the dashboard module 306 (e.g., when a player clicks a "Challenge" icon). The dashboard 900 includes tab 902 corresponding to a display of information about a player's current challenges. The dashboard 900 includes tab 904 corresponding to information about team challenges that the player is helping a buddy complete or a team challenge that a buddy has requested that the player help the buddy complete. In this example, tab 902 is selected. In various embodiments, the tabs 902 or 904 include a counter (e.g., "4") indicating the number of new entries to the tab since the player last viewed the entries on the tab. Each of the counters may be reset when the player views the entries on a tab. Additionally, new entries on a tab may be highlighted (e.g., new entries have a different background color than other entries visible on the tab).

Each of the entries on the tab 902 may include information 908 about the team challenge, including the name of the challenge, the reward offered for the completion of the challenge, the objective of the challenge, the number of players who must complete the challenge, and the time constraint for the challenge (e.g., "TIME LIMIT: 2 DAYS"). Each of the entries may also include a live counter 910 showing an amount of time remaining for completion of the team challenge. Each of the entries may also include information 912 regarding progress toward the completion of the team challenge, such as the percentage of completion of the team challenge. The information 912 may include icons indicating the buddies who have completed their portion of the challenge. Each of the entries may include a button 914 for initiating a challenge or for requesting that buddies help complete the challenge.

Figure 10:
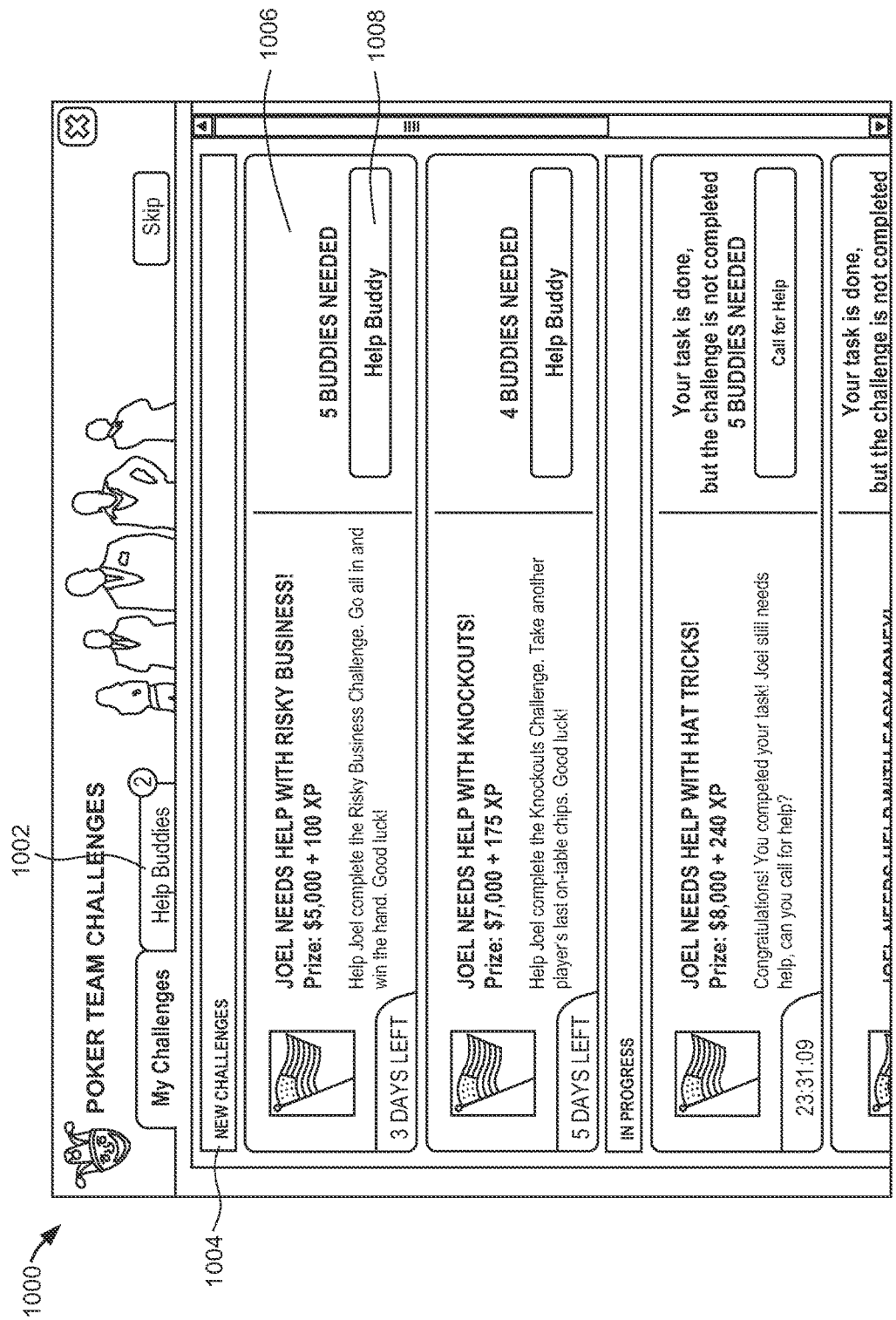
FIG. 10 is a block diagram illustrating an example dashboard for team challenges for a poker game.

FIG. 10 is a block diagram illustrating an example dashboard 1000 for team challenges for a poker game. The dashboard may be displayed by the dashboard module 306 (e.g., when a player clicks a "Challenge" icon). In this example, tab 1002, which corresponds to information about challenges that a player has been asked to participate in or has agreed to participate in, is selected. The entries of tab 1002 are organized by category (e.g., category 1004). For example, the category 1004 corresponds to "NEW CHALLENGES." Other categories may include in-progress challenges, completed challenges, or failed challenges, (Although not depicted in the dashboard 900 of FIG. 9, entries of the dashboard 900 may also be organized into categories.) Each entry of tab 1002 may include information 1006, including the number of buddies needed to complete the challenge, and whether the player has completed his portion of the team challenge. A button 1008 may indicate whether the player has been requested to participate in the team challenge (e.g., "Help Buddy") or whether additional players are needed to complete the team challenge (e.g., "Call for Help").

Figure 11:
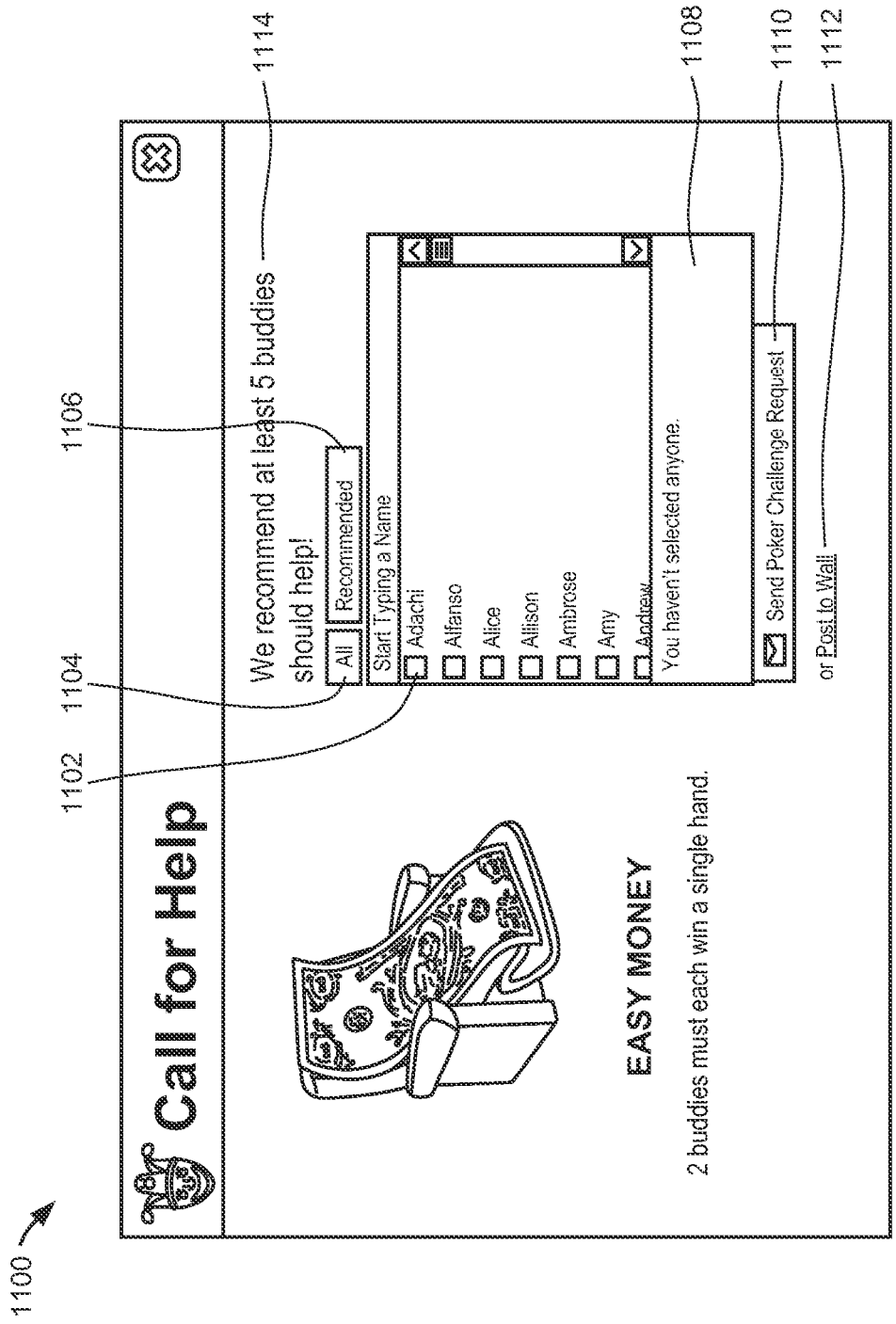
FIG. 11 is a block diagram illustrating an example user interface for listing buddies of the player.

FIG. 11. is a block diagram illustrating an example user interface 1100 for listing buddies of the player. The player may use the example user interface 1100 to select a set of buddies for participation in the team challenge as helpers. In an example embodiment, the example user interface 1100 is displayed by the helper-listing module 312. For example, the example user interface 1100 may be displayed when a player initiates a team challenge or when the player agrees to help a buddy complete a team challenge. In this example, the tab 1104 is selected, which corresponds to a listing of all the player's buddies who are eligible to participate in the team challenge. In various embodiments, the listing is derived by the accessing module 310 from information obtained from one or more social networks of the player. For example, the listing may be derived by the helper-listing module 312 from information that the accessing module 310 obtains from one or more social networks of the player. For example, such information may include people that the player has designated as buddies or friends on an out-of-game social network (e.g., Facebook).

The example user interface 1100 includes a tab 1106 for listing recommended buddies. The listing of recommended buddies may include a subset of buddies listed when tab 1104 is selected. The subset may be based on information about the player or buddies obtained by the accessing module from one or more social networks of the player or one or more social networks of the buddies of the player. Or the subset may be based on information collected and maintained by the game networking system 120b with respect to the player or his buddies. For example, the subset may be based on levels of activities of the player's buddies on the game networking system 120b.

Each of the players listed with respect to each of tabs 1104 and 1106 may be associated with a selectable user interface element (e.g., check box 1102). The player may select one or more of his buddies by clicking on the associated selectable user interface elements. Box 1108 may include a listing of buddies that the player has selected. Each entry in box 1108 may include a user interface element (e.g., an "X") that the user can select to deselect a previously selected buddy. Button 1110 is a user interface element that allows the player to notify the selected buddies that the player has requested that the buddies participate in a team challenge via an in-game or out-of-game messaging mechanism, such as a pokergram, a friend feed, an email message, and so on. The link 1112 is a user interface element that allows the player to notify his buddies of his request via postings on an out-of-game social network site (e.g., Facebook). In example embodiments, the helper-selection module 314 displays a preview of the message that will be posted on walls of the selected buddies, allowing the player to confirm or cancel the notification via the out-of-game social networking site based on the preview.

The example user interface 1100 includes a recommended number 1114 of buddies that should help. The helper listing module 312 may base the recommended number of buddies on a task definition or information that the accessing module 310 obtains about the player or his buddies from their online social networks or from information that the game networking system 120*b* collects and maintains.

Figure 12:
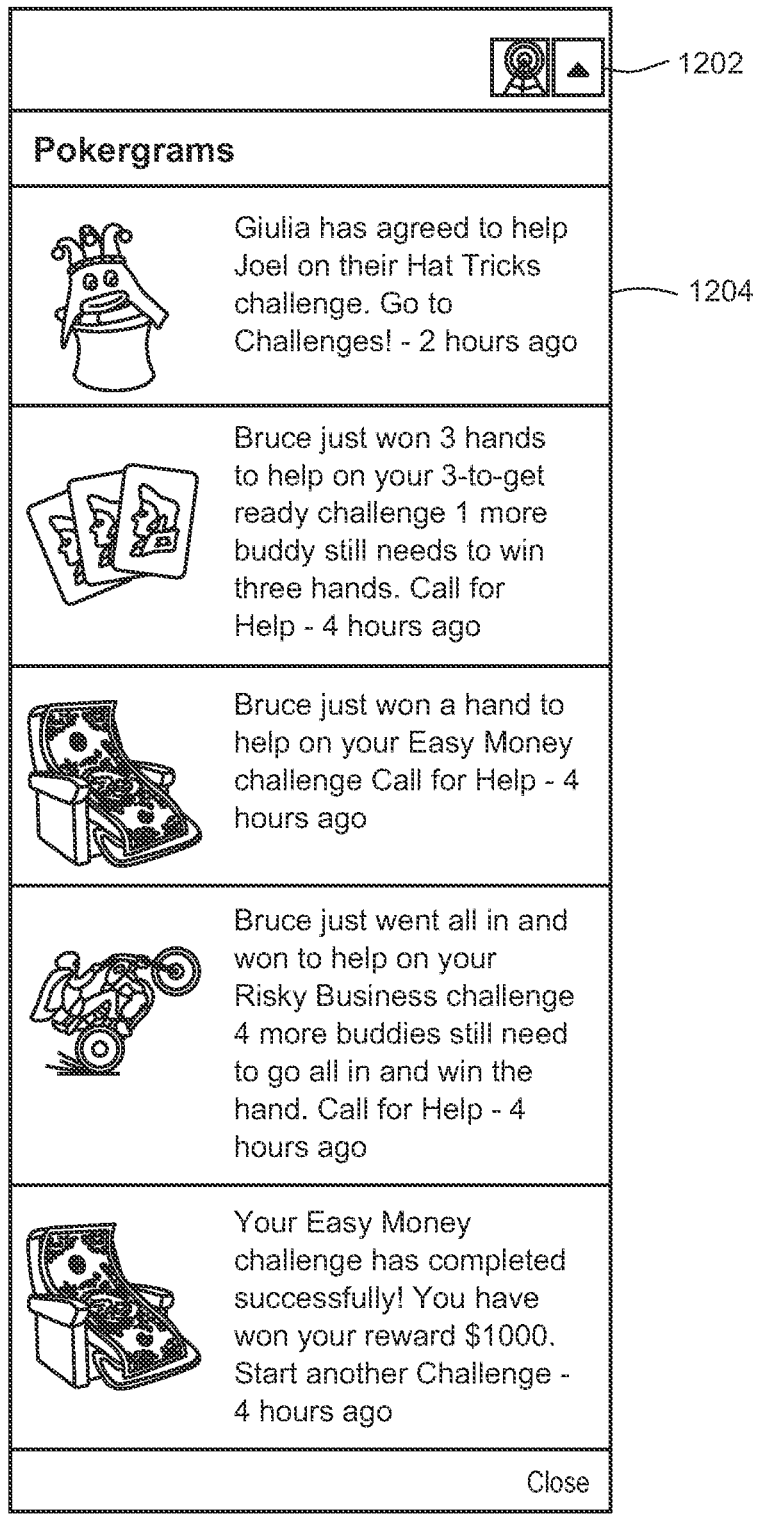
FIG. 12 is a block diagram illustrating an example user interface for accessing pokergrams.

FIG. 12 is a block diagram illustrating an example user interface 1200 for accessing pokergrams. As defined herein, a "pokergram" may be an in-game notification that has been sent to a player. For example, a pokergram may be a message notifying the player of an action one of his buddies has performed with respect to a team challenge. One skilled in the art will understand that such in-game notifications are not limited to poker games. In fact, they may be used in all types of games. The example user interface 1200 may include an icon 1202 for accessing a listing of pokergrams. Each entry (e.g., entry 1204) of the listing may include the notification itself as well as information related to the notification (e.g., when the notification was sent or links to other user interfaces for responding to the notification). The notifications may be provided by the helper-notification module 316.

Figure 13:
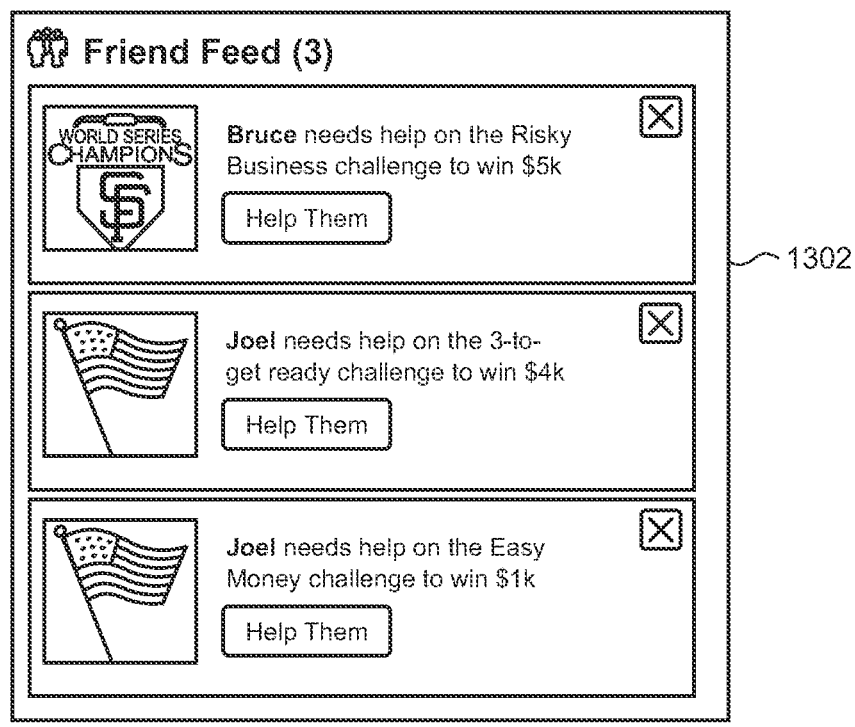
FIG. 13 is a block diagram illustrating an example user interface for a friend feed.

FIG. 13 is a block diagram illustrating an example user interface 1300 for a friend feed. As defined herein, a "friend feed" is a user interface in which news, events, or information about a player's friends or buddies is presented. For example, a friend feed may display information about team challenges that a player's friends have engaged in. Each such entry (e.g., entry 1302) may specify information about the team challenge, such as the name of the challenge and the amount of the reward associated with completing the challenge. Each entry may also include a user interface element (e.g., a button) that enables the player to perform an action with respect to the news item (e.g., indicate a willingness to help a buddy complete a team challenge). The exposure module 304 or the helper-notification module 316 may integrate news items relating to team challenges into the news feed of the social game.

Data Flow

Figure 14:
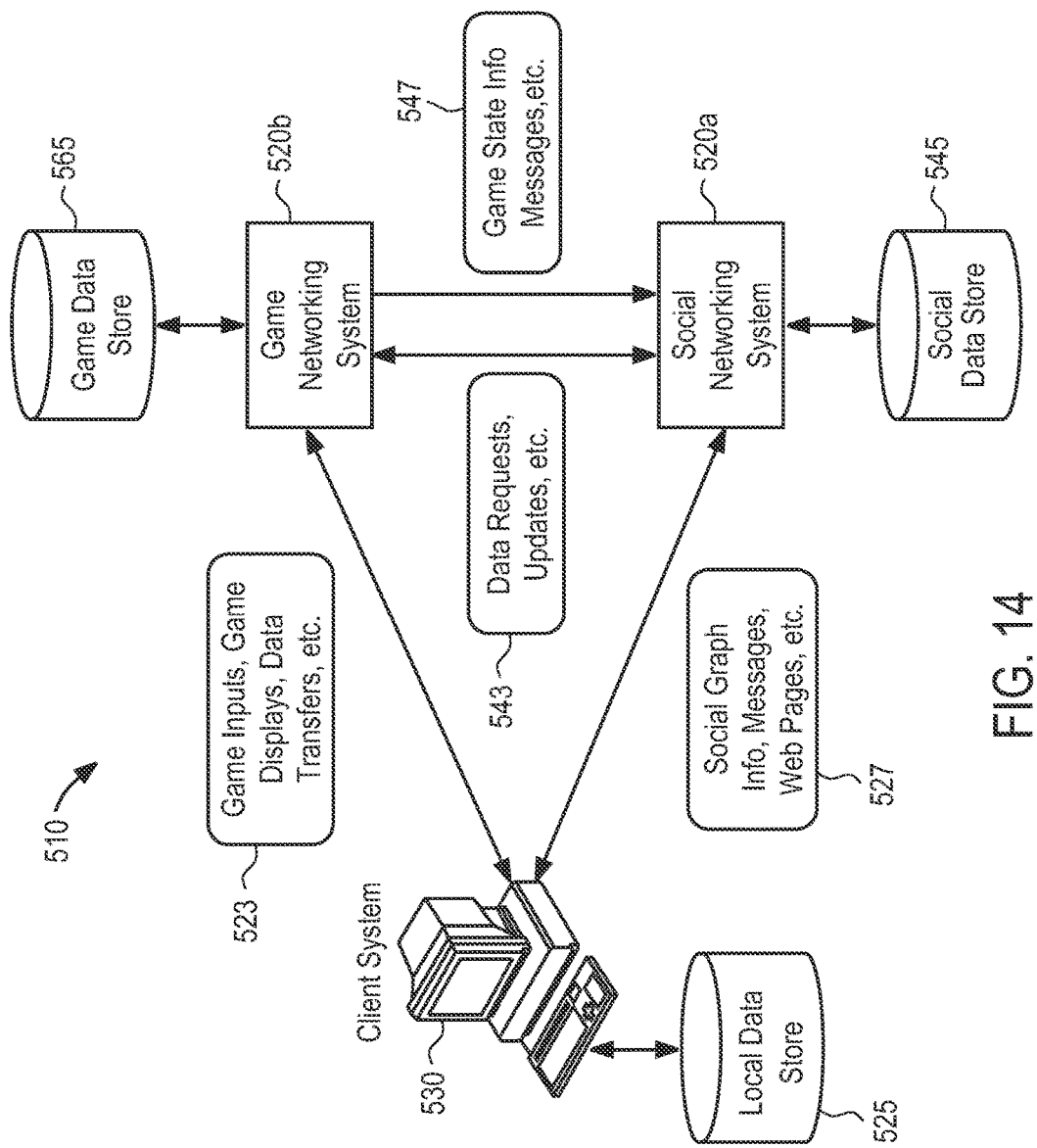
FIG. 14 is a block diagram illustrating an example data flow between the components of a system.

FIG. 14 is a block diagram illustrating an example data flow between the components of system 510. In particular embodiments, system 510 can include client system 530, social networking system 520*a*, and game networking system 520*b*. The components of system 510 can be connected to each other in any suitable configuration, using any suitable type of connection. The components may be connected directly or over any suitable network. Client system 530, social networking system 520*a*, and game networking system 520*b* can each have one or more corresponding data stores such as local data store 525, social data store 545, and game data store 565, respectively. Social networking system 520*a* and game networking system 520*b* can also have one or more servers that can communicate with client system 530 over an appropriate network. Social networking system 520*a* and game networking system 520*b* can have, for example, one or more internet servers for communicating with client system 530 via the Internet. Similarly, social networking system 520*a* and game networking system 520*b* can have one or more mobile servers for communicating with client system 530 via a mobile network (e.g., GSM, PCS, WPAN, etc.). In some embodiments, one server may be able to communicate with client system 530 over both the Internet and a mobile network. In other embodiments, separate servers can be used.

Client system 530 can receive and transmit data 523 to and from game networking system 520*b*. This data can include, for example, webpages, messages, game inputs, game displays, HTTP packets, data requests, transaction information, updates, and other suitable data. At some other time, or at the same time, game networking system 520*b* can communicate data 543, 547 (e.g., game state information, game system account information, page info, messages, data requests, updates, etc.) with other networking systems, such as social networking system 520*a* (e.g., Facebook, Myspace, etc.). Client system 530 can also receive and transmit data 527 to and from social networking system 520*a*. This data can include, for example, webpages, messages, social graph information, social network displays, HTTP packets, data requests, transaction information, updates, and other suitable data.

Communication between client system 530, social networking system 520*a*, and game networking system 520*b* can occur over any appropriate electronic communication medium or network using any suitable communications protocols. For example, client system 530, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP and other communications protocols, such as HTTP-S, FTP, SNMP, TELNET, and a number of other protocols, may be used. In addition, a server in one interaction context may be a client in another interaction context. In particular embodiments, the information transmitted between hosts may be formatted as HTML documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 520b, the BLOB containing the game state for the instance corresponding to the player can be transmitted to client system 530 for use by a client-side executed object to process. In particular embodiments, the client-side executable may be a Flash-based game, which can de-serialize the game state data in the BLOB. As a player plays the game, the game logic implemented at client system 530 maintains and modifies the various game state parameters locally. The client-side game logic may also batch game events, such as mouse clicks, and transmit these events to game networking system 520b. Game networking system 520b may itself operate by retrieving a copy of the BLOB from a database or an intermediate memory cache (memcache) layer. Game networking system 520b can also de-serialize the BLOB to resolve the game state parameters and execute its own game logic based on the events in the batch file of events transmitted by the client to synchronize the game state on the server side. Game networking system 520b may then re-serialize the game state, now modified, into a BLOB and pass this to a memory cache layer for lazy updates to a persistent database.

With a client-server environment in which the online games may run, one server system, such as game networking system 520b, may support multiple client systems 530. At any given time, there may be multiple players at multiple client systems 530 all playing the same online game. In practice, the number of players playing the same game at the same time may be very large. As the game progresses with each player, multiple players may provide different inputs to the online game at their respective client systems 530, and multiple client systems 530 may transmit multiple player inputs and/or game events to game networking system 520h for further processing. In addition, multiple client systems 530 may transmit other types of application data to game networking system 520b.

In particular embodiments, a computed-implemented game may be a text-based or turn-based game implemented as a series of web pages that are generated after a player selects one or more actions to perform. The web pages may be displayed in a browser client executed on client system 530. As an example and not by way of limitation, a client application downloaded to client system 530 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 520a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 530, either caused by an action of a game player or by the game logic itself, client system 530 may need to inform game networking system 520b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 510 is discussed in reference to updating a multi-player online game hosted on a network-addressable system (such as, for example, social networking system 520a or game networking system 520b), where an instance of the online game is executed remotely on a client system 530, which then transmits application event data to the hosting system such that the remote game server synchronizes the game state associated with the instance executed by the client system 530.

In a particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 530 may include a Flash client. The Flash client may be configured to receive and run Flash applications or game object codes from any suitable networking system (such as, for example, social networking system 520a or game networking system 520b). In particular embodiments, the Flash client may be run in a browser client executed on client system 530. A player can interact with Flash objects using client system 530 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 530, the Flash client may send the events that caused the game state changes to the in-game object to game networking system 520b. However, to expedite the processing and hence the speed of the overall gaming experience, the Flash client may collect a batch of some number of events or updates into a batch file. The number of events or updates may be determined by the Flash client dynamically or determined by game networking system 520b based on server loads or other factors. For example, client system 530 may send a batch file to game networking system 520b whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 530. In particular embodiments; the batch file may be a text file and the name-value pairs may be in string format.

In particular embodiments, when a player plays an online game on client system 530, game networking system 520b may serialize all the game-related data, including, for example and without limitation, game states, game events, and user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 520b may retrieve the corresponding BLOB from the database to determine the most-recent values of the game-related data. In particular embodiments, while a player is playing the online game, game networking system 520b may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 15:
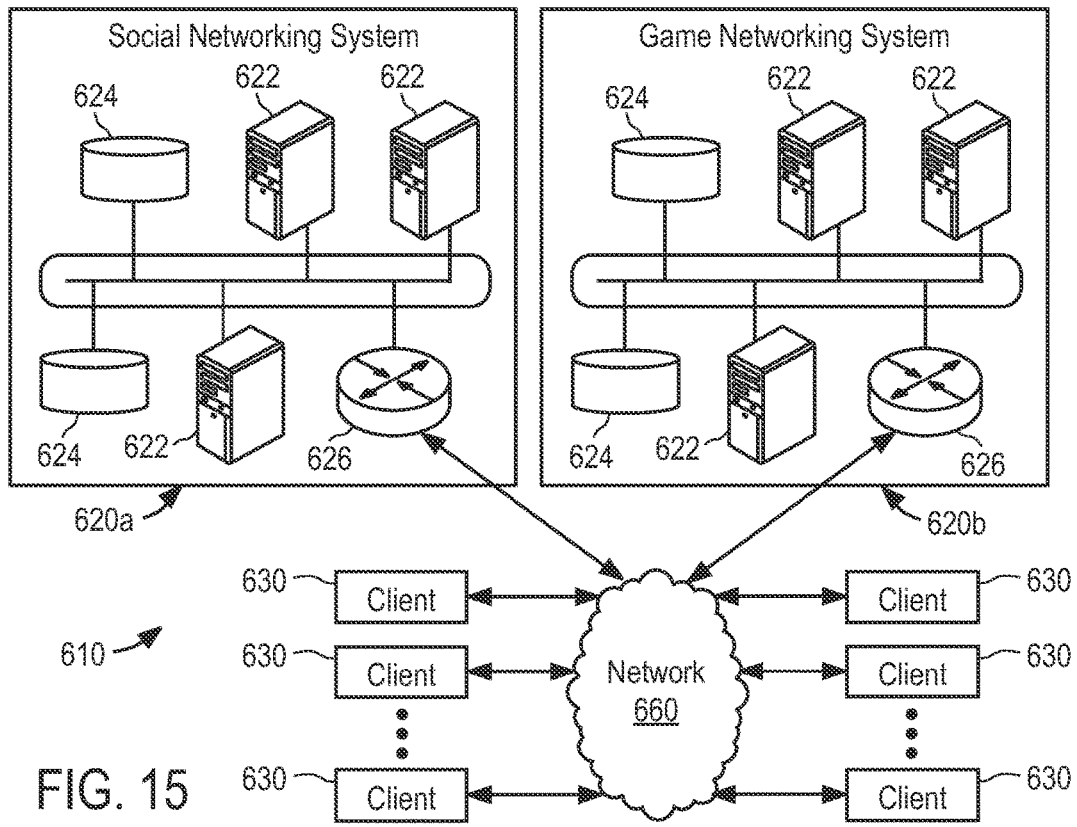
FIG. 15 is a block diagram illustrating an example network environment, in which various example embodiments may operate.

Particular embodiments may operate in a wide area network environment, such as the Internet, including multiple network addressable systems. FIG. 15 is a block diagram illustrating an example network environment 610, in which various example embodiments may operate. Network cloud 660 generally represents one or more interconnected networks, over which the systems and hosts described herein can communicate. Network cloud 660 may include packet-based WANs (such as the Internet), private networks, wireless networks, satellite networks, cellular networks, paging networks, and the like. As FIG. 15 illustrates, particular embodiments may operate in a network environment comprising one or more networking systems, such as social networking system 620a, game networking system 620b, and one or more client systems 630. The components of social networking system 620a and game networking system 620b operate analogously; as such, hereinafter they' may be referred to simply as networking system 620. Client systems 630 are operably connected to the network environment via a network service provider, a wireless carrier, or any other suitable means.

Networking system 620 is a network addressable system that, in various example embodiments, comprises one or more physical servers 622 and data stores 624. The one or more physical servers 622 are operably connected to computer network 660 via, by way of example, a set of routers and/or networking switches 626. In an example embodiment, the functionality hosted by the one or more physical servers 622 may include web or HTTP servers, FTP servers, application servers, as well as, without limitation, webpages and applications implemented using Common Gateway Interface (CGI) script, PHP Hyper-text Preprocessor (PHP), Active Server Pages (ASP), HTML, XML, Java, JavaScript, Asynchronous JavaScript and XML (AJAX), Flash, ActionScript, and the like.

Physical servers 622 may host functionality directed to the operations of networking system 620. Hereinafter servers 622 may be referred to as server 622, although server 622 may include numerous servers hosting, for example, networking system 620, as well as other content distribution servers, data stores, and databases. Data store 624 may store content and data relating to, and enabling, operation of networking system 620 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 624 corresponds to one or more of a variety of separate and integrated databases, such as relational databases and object-oriented databases, that maintain information as an integrated collection of logically related records or files stored on one or more physical systems. Structurally, data, store 624 may generally include one or more of a large class of data storage and management systems. In particular embodiments, data store 624 may be implemented by any suitable physical system(s) including components, such as one or more database servers, mass storage media, media library systems, storage area networks, data storage clouds, and the like. In one example embodiment, data store 624 includes one or more servers, databases (e.g., MySQL), and/or data warehouses. Data store 624 may include data associated with different networking system 620 users and/or client systems 630.

Client system 630 is generally a computer or computing device including functionality for communicating (e.g., remotely) over a computer network. Client system 630 may be a desktop computer, laptop computer, personal digital assistant (PDA), in- or out-of-car navigation system, smart phone or other cellular or mobile phone, or mobile gaming device, among other suitable computing devices. Client system 630 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 630 to enter addresses of specific network resources to be retrieved, such as resources hosted by networking system 620. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is HTML. Other common web browser-supported languages and technologies include XML, Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications; and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 630 desires to view a particular webpage (hereinafter also referred to as a target structured document) hosted by networking system 620, the user's web browser, or other document rendering engine or suitable client application, formulates and transmits a request to networking system 620. The request generally includes a URL or other document identifier as well as metadata or other information. By way of example, the request may include information identifying the user, such as a user identifier (ID), as well as information identifying or characterizing the web browser or operating system running on the user's client computing device 630. The request may also include location information identifying a geographic location of the user's client system or a logical network location of the user's client system. The request may also include a timestamp identifying when the request was transmitted.

Although the example network environment 610 described above and illustrated in FIG. 15 described with respect to social networking system 620a and game networking system 620b, this disclosure encompasses any suitable network environment using any suitable systems. As an example and not by way of limitation, the network environment may include online media systems, online reviewing systems, online search engines, online advertising systems, or any combination of two or more such systems.

Figure 16:
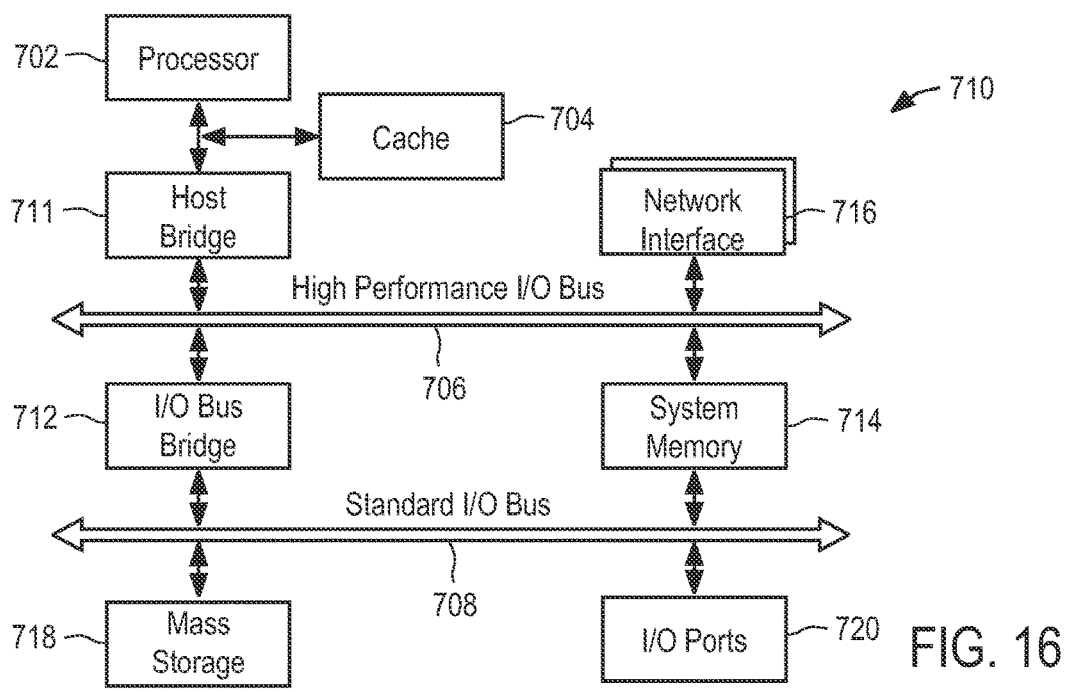
FIG. 16 is a block diagram illustrating an example computing system architecture, which may be used to implement a server or a client system.

FIG. 16 is a block diagram illustrating an example computing system architecture, which may be used to implement a server 622 or a client system 630. In one embodiment, hardware system 710 comprises a processor 702, a cache memory 704, and one or more executable modules and drivers, stored on a tangible computer readable medium, directed to the functions described herein. Additionally, hardware system 710 may include a high performance input/output (I/O) bus 706 and a standard I/O bus 708. A host bridge 711 may couple processor 702 to high performance I/O bus 706, whereas I/O bus bridge 712 couples the two buses 706 and 708 to each other. A system memory 714 and one or more network/communication interfaces 716 may couple to bus 706. Hardware system 710 may further include video memory (not shown) and a display device coupled to the video memory. Mass storage 718 and I/O ports 720 may couple to bus 708. Hardware system 710 may optionally include a keyboard, a pointing device, and a display device (not shown) coupled to bus 708. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc. of Sunnyvale, Calif., as well as any other suitable processor.

The elements of hardware system 710 are described in greater detail below. In particular, network interface 716 provides communication between hardware system 710 and any of a wide range of networks, such as an Ethernet (e.g., IEEE 802.3) network, a backplane, and so forth. Mass storage 718 provides permanent storage for the data and programming instructions to perform the above-described functions implemented in servers 622, whereas system memory 714 (e.g., DRAM) provides temporary storage for the data, and programming instructions when executed by processor 702. I/O ports 720 are one or more serial and/or parallel communication ports that provide communication between additional peripheral devices, which may be coupled to hardware system 710.

Hardware system 710 may include a variety of system architectures and various components of hardware system 710 may be rearranged. For example, cache 704 may be on-chip with processor 702. Alternatively, cache 704 and processor 702 may be packed together as a "processor module," with processor 702 being referred to as the "processor core." Furthermore, certain embodiments of the present disclosure may not require nor include all of the above components. For example, the peripheral devices shown coupled to standard I/O bus 708 may couple to high performance I/O bus 706. In addition, in some embodiments, only a single bus may exist, with the components of hardware system 710 being coupled to the single bus. Furthermore, hardware system 710 may include additional components, such as additional processors, storage devices, or memories.

An operating system manages and controls the operation of hardware system 710, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSI) operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding," "locating," "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, PDA, personal gaming device, etc.), that makes API calls directly to a server. Still further, while the embodiments described above operate with respect to a poker game, the embodiments can be applied to any game that includes multiple players. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method comprising:
generating a user interface for controlling participation of a player of a plurality of players of a game executing on a game networking system in a plurality of team challenges associated with the game, the user interface representing the plurality of team challenges based on a plurality of definitions defining the team challenges, the plurality of definitions stored in a database of the game networking system, each of the plurality of definitions specifying an objective that is to be achieved together by a subset of the plurality of players within the game to complete the team challenge and an unlock value that specifies an experience level that the player must have to initiate the team challenge, the user interface including:
 a first user interface element, the first user interface element allowing the player to, based on a level of mastery of the player or based on the experience level of the player satisfying the unlock value corresponding to the first team challenge, serve as an initiator of the first team challenge by requesting to start the first team challenge; and
 a second user interface element, the second user interface element allowing the player to serve as a helper in a completion of a second team challenge of the plurality of team challenges based on the level of mastery of the player or based on the experience level of the player satisfying an unlock value corresponding to the second team challenge, the second team challenge previously initiated by an additional player of the plurality of players, the additional player being a buddy of the player;
based on a detecting of a completion of the first team challenge or the second team challenge the completion of, increasing the experience level of the player with respect to the first team challenge or the second team challenge;
based on the increased experience level of the player with respect to the first team challenge or the second team challenge, increasing the level of mastery of the player;
unlocking a third team challenge for starting by the player based on the increased level of mastery of the player; and
generating an update to the user interface, the update including a representation of the unlocked third team challenge and a representation of the increased level of mastery of the player, one or more modules incorporated into the game networking system to configure one or more processors of the game networking system to perform the updating of the user interface.

2. The method of claim 1, wherein each of the plurality of definitions includes a time constraint and the increasing of the level of mastery is based on the completion of the first team challenge or the completion of the second team challenge falling within the time constraint.

3. The method of claim 1, wherein each of the plurality of definitions includes a count constraint and a size of the subset is limited based on the count constraint.

4. A non-transitory machine-readable storage medium embodying a set of instructions included in one or more modules incorporated into a game networking system that, when executed by one or more computer processors of the game networking system, cause the one or more computer processors to perform operations, the operations comprising:
generating a user interface for controlling participation of a player of a plurality of players of a game executing on a game networking system in a plurality of team challenges associated with the game, the user interface representing the plurality of team challenges based on a plurality of definitions defining the team challenges, the plurality of definitions stored in a database of the game networking system, each of the plurality of definitions specifying an objective that is to be achieved together by a subset of the plurality of players within the game to complete the team challenge and an unlock value that specifies an experience level that the player must have to initiate the team challenge, the user interface including:
 a first user interface element, the first user interface element allowing the player to, based on a level of mastery of the player or based on the experience level of the player satisfying the unlock value corresponding to the first team challenge, serve as an initiator of the first team challenge by requesting to start the first team challenge; and
 a second user interface element, the second user interface element allowing the player to serve as a helper in a completion of a second team challenge of the plurality of team challenges based on the level of mastery of the player or based on the experience level of the player satisfying an unlock value corresponding to the second team challenge, the second team challenge previously initiated by an additional player of the plurality of players, the additional player being a buddy of the player;

based on a detecting of a completion of the first team challenge or the completion of the second team challenge, increasing the experience level of the player with respect to the first team challenge or the second team challenge;

based on the increased experience level of the player with respect to the first team challenge or the second team challenge, increasing the level of mastery of the player;

unlocking a third team challenge for starting by the player based on the increased level of mastery of the player; and generating an update to the user interface, the update including a representation of the unlocked third team challenge and a representation of the increased level of mastery of the player.

5. The non-transitory machine-readable storage medium of claim 4, wherein each of the plurality of definitions includes a time constraint and the increasing of the level of mastery is based on the completion of the first team challenge or the completion of the second team challenge falling within the time constraint.

6. A system comprising:
one or more processors;
one or more modules incorporated into a game networking system, the one or more modules configuring the one or more processors to, at least:
generate a user interface for controlling participation of a player of a plurality of players of a game executing on a game networking system in a plurality of team challenges associated with the game, the user interface representing the plurality of team challenges based on a plurality of definitions defining the team challenges, the plurality of definitions stored in a database of the game networking system, each of the plurality of definitions specifying an objective that is to be achieved together by a subset of the plurality of players within the game to complete the team challenge and an unlock value that specifies an experience level that the player must have to initiate the team challenge, the user interface including:

a first user interface element, the first user interface element allowing the player to, based on a level of mastery of the player or based on the experience level of the player satisfying the unlock value corresponding to the first team challenge, serve as an initiator of the first team challenge by requesting to start the first team challenge; and a second user interface element, the second user interface element allowing the player to serve as a helper in a completion of a second team challenge of the plurality of team challenges based on the level of mastery of the player or based on the experience level of the player satisfying an unlock value corresponding to the second team challenge, the second team challenge previously initiated by an additional player of the plurality of players, the additional player being a buddy of the player;

based on a detecting of a completion of the first team challenge or the completion of the second team challenge, increase the experience level of the player with respect to the first team challenge or the second team challenge;

based on the increased experience level of the player with respect to the first team challenge or the second team challenge, increase the level of mastery of the player;

unlock a third team challenge for starting by the player based on the increased level of mastery of the player; and generate an update to the user interface, the update including a representation of the unlocked third team challenge and a representation of the increased level of mastery of the player.

7. The system of claim 6, wherein each of the plurality of definitions includes a time constraint and the increasing of the level of mastery is based on the completion of the first team challenge or the completion of the second team challenge falling within the time constraint.

\* \* \* \* \*

UNITED STATES PATENT AND TRADEMARK OFFICE
CERTIFICATE OF CORRECTION

PATENT NO. : 9,715,789 B1  
APPLICATION NO. : 13/077706  
DATED : July 25, 2017  
INVENTOR(S) : Kane et al.

Page 1 of 2

It is certified that error appears in the above-identified patent and that said Letters Patent is hereby corrected as shown below:

In the Specification

In Column 5, Line 28, before "offline)", insert --(i.e.,--

In Column 5, Line 41, delete "watt" and insert --wall-- therefor

In Column 9, Line 28, delete "320b" and insert --620b-- therefor

In Column 12, Line 39, delete "live" and insert --five-- therefor

In Column 13, Line 31, delete "102a)." and insert --250).-- therefor

In Column 14, Line 52, delete "may," and insert --may-- therefor

In Column 15, Line 1, delete "120a" and insert --120b-- therefor

In Column 15, Line 34, delete "322" and insert --318-- therefor

In Column 15, Line 38, delete "322" and insert --318-- therefor

In Column 15, Line 41, delete "324" and insert --322-- therefor

In Column 15, Line 46, delete "324" and insert --322-- therefor

In Column 15, Line 52, delete "324" and insert --322-- therefor

In Column 15, Line 53, delete "324" and insert --322-- therefor

In Column 15, Line 62, delete "324" and insert --322-- therefor

Signed and Sealed this  
Twenty-first Day of April, 2020

Andrei Iancu  
*Director of the United States Patent and Trademark Office*

CERTIFICATE OF CORRECTION (continued)
U.S. Pat. No. 9,715,789 B1

In Column 15, Line 65, delete "324" and insert --322-- therefor

In Column 16, Line 1, delete "324" and insert --322-- therefor

In Column 16, Line 7, delete "324" and insert --322-- therefor

In Column 16, Line 10, delete "324" and insert --322-- therefor

In Column 16, Line 11, delete "322)." and insert --318).-- therefor

In Column 16, Line 12, delete "324" and insert --322-- therefor

In Column 16, Line 28, delete "324" and insert --322-- therefor

In Column 17, Line 30, delete "860" and insert --820-- therefor

In Column 17, Line 53, after "counter", insert --906--

In Column 20, Line 9, after "PCS,", insert --Wi-Fi,--

In Column 21, Line 36, delete "520h" and insert --520b-- therefor

In Column 23, Line 13, delete "embodiments;" and insert --embodiments,-- therefor In Column 23, Line 61, delete "they'" and insert --they-- therefor In Column 24, Line 34, delete "data," and insert --data-- therefor In Column 25, Line 14, delete "applications;" and insert --applications,-- therefor In Column 26, Line 18, delete "data," and insert --data-- therefor In Column 26, Line 48, delete "BSI)" and insert --BSD-- therefor In the Claims In Column 28, Line 12-13, in Claim 1, delete "the second team challenge the completion of," and insert --the completion of the second team challenge,-- therefor